(12) United States Patent
Eichenfield et al.

(10) Patent No.: US 12,204,183 B1
(45) Date of Patent: Jan. 21, 2025

(54) ACOUSTOELECTRIC OPTOMECHANICAL DEVICES

(71) Applicant: National Technology & Engineering Solutions of Sandia, LLC, Albuquerque, NM (US)

(72) Inventors: Matt Eichenfield, Albuquerque, NM (US); Nils Thomas Otterstrom, Edgewood, NM (US); Lisa Anne Plucinski Hackett, Albuquerque, NM (US); Matthew Joseph Storey, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 269 days.

(21) Appl. No.: 18/071,846

(22) Filed: Nov. 30, 2022

Related U.S. Application Data

(60) Provisional application No. 63/286,626, filed on Dec. 7, 2021.

(51) Int. Cl.
*G02F 1/01* (2006.01)
*G02F 1/025* (2006.01)

(52) U.S. Cl.
CPC ............ *G02F 1/025* (2013.01); *G02F 1/0128* (2013.01); *G02F 1/0136* (2013.01); *G02F 2201/302* (2013.01)

(58) Field of Classification Search
CPC ...... G02F 1/0128; G02F 1/0136; G02F 1/025; G02F 2201/302
See application file for complete search history.

(56) References Cited

U.S. PATENT DOCUMENTS

| | | | |
|---|---|---|---|
| 9,268,092 B1 * | 2/2016 | Jarecki, Jr | G02F 1/125 |
| 10,666,222 B1 * | 5/2020 | Eichenfield | H03H 9/02559 |

(Continued)

OTHER PUBLICATIONS

Andrushchak, A. S. et al., "Complete sets of elastic constants and photoelastic coefficients of pure and MgO-doped lithium niobate crystals at room temperature," Journal of Applied Physics (2009) 106:073510, 6 pages.

(Continued)

*Primary Examiner* — Ryan A Lepisto
(74) *Attorney, Agent, or Firm* — Mark A. Dodd

(57) ABSTRACT

Devices employing Brillouin interactions that can be modified by acoustoelectric (AE) interactions, thereby enabling control over the devices' nonlinear optical susceptibility, are described. Modification of the phonon dissipation rates through application of quasistatic electric fields in the semiconductor can improve the performance of Brillouin photonic devices. These AE Brillouin interactions allow for local control of the phonon phase velocity and thus the Brillouin scattering frequencies, providing an electronic means to compensate for inhomogeneous broadening that occurs over large length scales. Moreover, these AE Brillouin interactions allow Brillouin scattering processes to employ phonon coherence lengths that can achieve parity with and even exceed those of the photons, enabling fully coherent three-wave parametric-like processes. Devices in accordance with various aspects of the present invention have simultaneously demonstrated, using these effects, both large optomechanical confinement and coupling, and AE coupling.

20 Claims, 19 Drawing Sheets

(56) References Cited

U.S. PATENT DOCUMENTS

| | | | | |
|---|---|---|---|---|
| 11,150,609 B1* | 10/2021 | Parazzoli | ............ | H01J 49/424 |
| 11,948,979 B1* | 4/2024 | Eichenfield | ............ | H03F 3/187 |
| 12,112,236 B1* | 10/2024 | Eichenfield | ............ | H10N 60/80 |

OTHER PUBLICATIONS

Hackett, L. et al., "High-gain leaky surface acoustic wave amplifier in epitaxial InGaAs on lithium niobate heterostructure," Applied Physics Letters (2019) 114:253503, 5 pages.

Hackett, L. et al., "Towards single-chip radiofrequency signal processing via acoustoelectric electron-phonon Interactions," Nature Communications (2021) 12:2769, 11 pages.

Kino, G. S. et al., "A Normal Mode Theory for the Rayleigh Wave Amplifier," IEEE Transactions on Electron Devices (1971) ed-18(10):909-920.

Otterstrom, N. T. et al., "Resonantly enhanced nonreciprocal silicon Brillouin amplifier," Optica (2019) 6(9):1117-1123.

\* cited by examiner

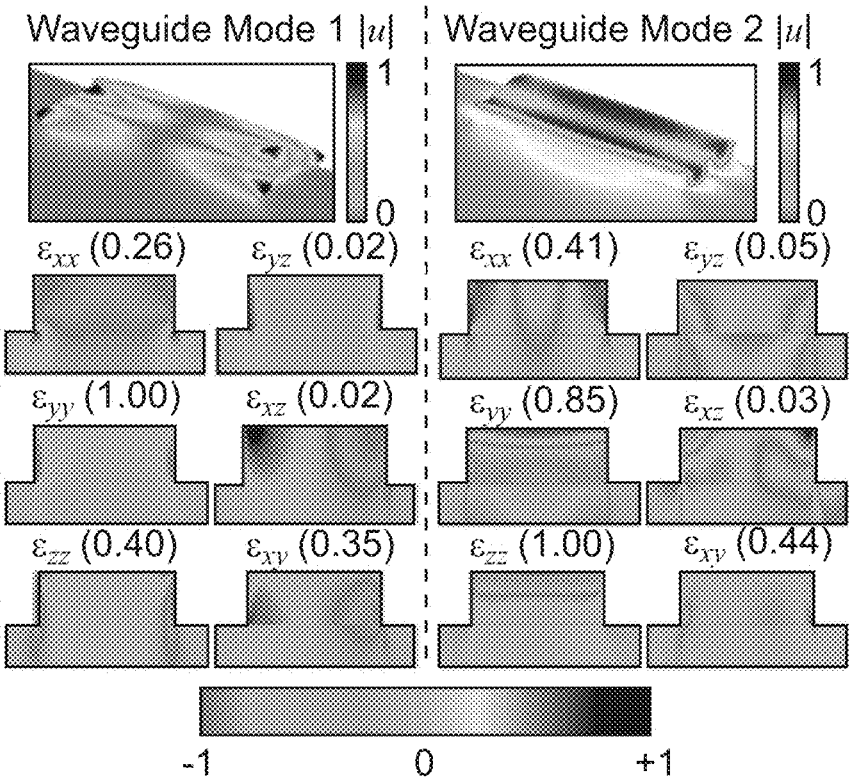
FIG. 8A  FIG. 8B
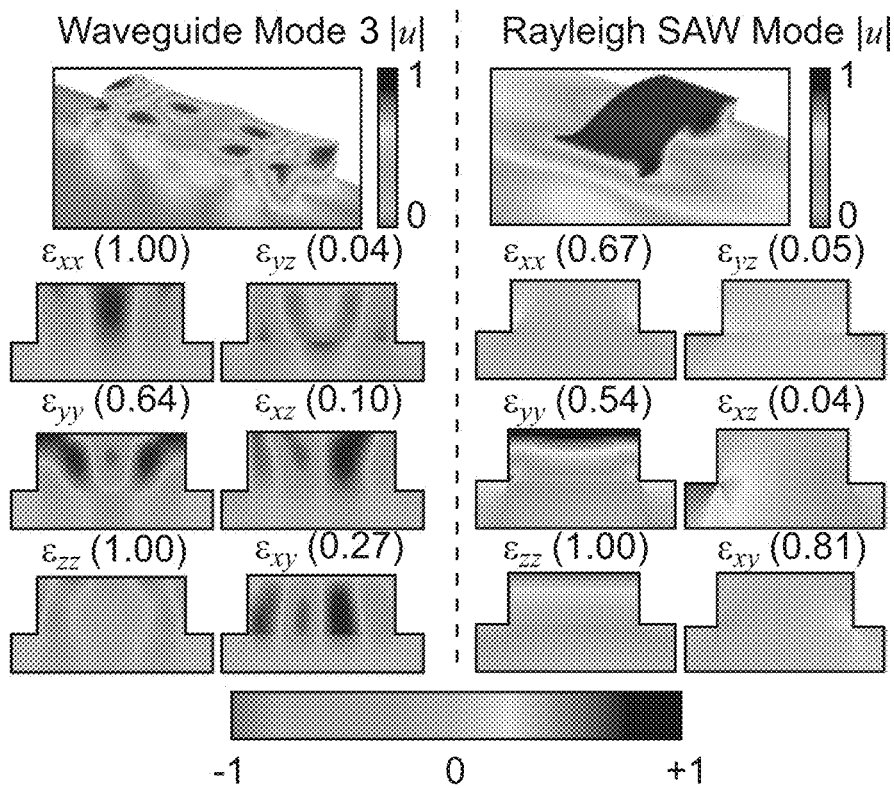
FIG. 8C  FIG. 8D

ACOUSTOELECTRIC OPTOMECHANICAL DEVICES

RELATED APPLICATIONS

This application claims priority to U.S. Provisional Application No. 63/286,626, filed on Dec. 7, 2021, and entitled ACOUSTOELECTRIC OPTOMECHANICAL DEVICES, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to devices employing Brillouin nonlinear susceptibility, and in particular, to devices in which the Brillouin nonlinear susceptibility is altered using the acoustoelectric effect.

BACKGROUND

Optomechanical (OM) Brillouin interactions are unique among nonlinear optical processes in that they are enabled by phonons and thus strongly depend on the elastic properties of a material. In optical waveguides, the supported phonon modes determine the types of allowed stimulated Brillouin scattering (SBS) processes, including the traditional intra-modal backward, intra-modal forward, or inter-modal forward SBS, as well as the characteristic SBS frequencies, nonlinear coupling strengths, and bandwidths. Leveraging these distinctive properties, SBS has become the basis for a range of flexible and powerful optical signal processing technologies such as amplifiers, lasers, filters, nonreciprocal devices, and optical delay lines. However, despite the wide application space for SBS devices, the dynamics and resulting utility of these interactions have historically been limited by the host material's intrinsic elastic and optical properties. Two fundamental material properties that determine the Brillouin susceptibility are the phononic dissipation rate and velocity. Although these properties and the resulting Brillouin susceptibility can be significantly enhanced by patterning materials into waveguides, the underlying material properties are generally considered intrinsic and static. For a given material, these properties ultimately limit the strength of these scattering processes and the performance of devices utilizing them.

In this context, the ability to electrically control phononic loss, or even induce phononic gain, could enable dynamic reconfigurability of the Brillouin susceptibility, suppressing or enhancing the nonlinear response by orders of magnitude on demand. Coulomb drag interactions between electrons and phonons in semiconductors provide a powerful mechanism to deterministically modify the phonon velocity and dissipation. This Coulomb drag effect is achieved in practice by applying external, quasi-static electric fields to the semiconductor charge carriers to produce a drift current. The drifting carriers then interact with, and become spatially polarized by, the generated charge distribution of the phonons via the electric fields they induce. The resulting coupling between the two moving charge distributions ultimately allows non-reciprocal amplification, attenuation, and velocity modification of the phonons. Although the acoustoelectric (AE) effect can be produced by different mechanisms in many materials, the strongest interactions were predicted to exist and then demonstrated in piezoelectric semiconductors. Going beyond the effects intrinsic to single materials, it was proposed that heterostructures that combine the strongest piezoelectric materials with high-mobility semiconductors could produce exceptionally large AE effects, and this ultimately allowed demonstrations of devices such as radio frequency acoustic amplifiers, convolvers, and correlators. Recent advances in semiconductor epitaxy, heterogeneous integration, and nanofabrication have led to a new class of AE heterostructures, enabling ultra-compact acoustic amplifiers, circulators, and switches, with performance that greatly surpasses that which was previously possible.

In spite of these previous efforts, the need still exists for Brillouin interaction-based photonic devices in which the phonons' dissipation rates and velocities are tunable.

SUMMARY

One aspect of the present invention relates to devices employing Brillouin interactions that can be modified by AE interactions, thereby allowing unprecedented control over the devices' nonlinear optical susceptibility. The modifications to both the real and imaginary parts of the susceptibility lead to novel effects and dynamics that are not intrinsically accessible with these materials. In particular, modification of the phonon dissipation rates through application of quasistatic electric fields in the semiconductor can drastically improve the performance of archetypal Brillouin photonic devices such as Brillouin amplifiers, laser oscillators, nonreciprocal devices, and delay lines. These AE Brillouin interactions allow for local control of the phonon phase velocity and thus the Brillouin scattering frequencies, providing an electronic means to compensate for inhomogeneous broadening that occurs over large length scales. Moreover, these AE Brillouin interactions allow Brillouin scattering processes to go from a regime where the phonon coherence lengths are significantly less than those of the photons—behaving effectively as incoherent scatterers —to one in which the phonon coherence lengths can achieve parity with and even exceed those of the photons, enabling fully coherent scattering that resembles the dynamics of optical parametric processes. Devices in accordance with various aspects of the present invention have demonstrated these effects, simultaneously allowing large OM confinement and coupling ($|g_0| \approx 8000$ rad m$^{1/2}$ s$^{-1}$) and AE coupling ($k^2 \approx 6\%$). These effects are predicted to be achievable with a variety of materials platforms, novel devices, and applications.

In at least one embodiment of the invention, an acoustoelectric (AE) Brillouin device comprises a substrate including a layer supporting AE coupling, a waveguide on the layer supporting AE coupling (the waveguide transmitting an optical signal and an optical pump, the waveguide including semiconductor material, the semiconductor material including free carriers, wherein at least one of the layer supporting AE coupling or the semiconductor material provides AE gain), and first and second contacts (the first and second contacts in electrical contact with corresponding opposite ends of a portion of the semiconductor material thereby defining an interaction region, the first and second contacts applying a drift field across the interaction region), wherein a combination of the layer supporting AE coupling and the interaction region simultaneously support both optical and acoustic modes enabling a strong overlap of optical and acoustic modes, significant optomechanical coupling, and significant AE gain).

In various embodiments, $$\frac{\Gamma}{\Gamma - G_{AE}} \geq 0.5,$$

where $G_{AE}$ is the AE phonon gain rate (in sec$^{-1}$) and $\Gamma$ is the intrinsic phonon loss rate (in sec$^{-1}$); $G_B PL \geq 0.1$, where $G_B$ is a Brillouin gain coefficient (in watts$^{-1}$ meters$^{-1}$), P is a pump power (in watts), and L is a length of the interaction region (in meters); the AE Brillouin device employs an optically resonant configuration with an effective propagation length of $L = L_{\mathit{eff}}$ (in meters), such that $$G_B PL_{\mathit{eff}} \geq 0.1; \; G_B PL \times \frac{\Gamma}{\Gamma - G_{AE}} \geq 0.2,$$

where $G_B$ is a Brillouin gain coefficient (in watts$^{-1}$ meters$^{-1}$), P is a pump power (in watts), L is a length of the interaction region (in meters), $G_{AE}$ is the AE phonon gain rate (in sec$^{-1}$), and $\Gamma$ is the intrinsic phonon loss rate (in sec$^{-1}$); and the AE Brillouin device employs an optically resonant configuration with an effective propagation length of $L = L_{\mathit{eff}}$ (in meters), such that $$G_B PL_{\mathit{eff}} \times \frac{\Gamma}{\Gamma - G_{AE}} \geq 0.2.$$

In other embodiments, the AE Brillouin device operates in one of an inter-modal forward stimulated Brillouin scattering mode (for which an acoustic wavelength within the semiconductor material is between approximately 1.0 μm and approximately 100 μm), an intra-modal backward stimulated Brillouin scattering mode (for which an acoustic wavelength within the semiconductor material is between approximately 0.1 μm and approximately 4.0 μm) or an intra-modal forward stimulated Brillouin scattering mode (for which an acoustic wavelength within the semiconductor material is at least approximately 100 μm); the AE Brillouin device operates as an amplifier (the amplifier having a linear or an optically resonant configuration); the AE Brillouin device operates as an oscillator (the AE Brillouin device further comprising an optical resonator, the optical resonator optically coupled to the waveguide); the AE Brillouin device operates as an isolator (the waveguide being a drive waveguide, the drive waveguide creating an acousto-optic grating due to the optical signal and the optical pump, and the AE Brillouin device further comprises a modulator waveguide, the modulator waveguide phononically coupled to the drive waveguide, the modulator waveguide receiving a modulated signal, the modulated signal being transmitted when applied to a first end of the modulator waveguide, the modulated signal being scattered when applied to a second end of the modulator waveguide opposite the first end of the modulator waveguide); and the AE Brillouin device operates as a phononic memory having a linear or an optically resonant configuration, an effective delay length of the phononic memory being a function of the drift field).

In still other embodiments, the AE Brillouin device further comprises first and second optical grating couplers (the first and second optical gratings located on corresponding opposite ends of the waveguide, each of the first and second optical gratings transmitting or receiving the optical signal or the optical pump); the layer supporting AE coupling includes at LiNbO$_3$, AlN, ScAlN, Ge, GaAs, GaP, or GaN; the substrate includes silicon or sapphire; at least a portion of the waveguide is suspended above the substrate; a thickness of the waveguide is between approximately 100 nm and approximately 300 nm; a width of the waveguide is between approximately 0.5 μm and approximately 2.0 μm; the semiconductor material includes InGaAsP, InGaAs, or Si; the waveguide supports two optical modes (each of the two optical modes being a TE$_0$ optical mode, a TE$_1$ optical mode, a TE$_2$ optical mode, a TM$_0$ optical mode, or a TM$_1$ optical mode); and the waveguide supports a Rayleigh acoustic mode, a shear horizontal acoustic mode, or an acoustic waveguide mode.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIGS. 8A-8E illustrate the calculated elastic mode intensities for several AE Brillouin devices in accordance with one or more embodiments of the present invention.

DETAILED DESCRIPTION

Theoretical Operating Principles

Figure 1A:
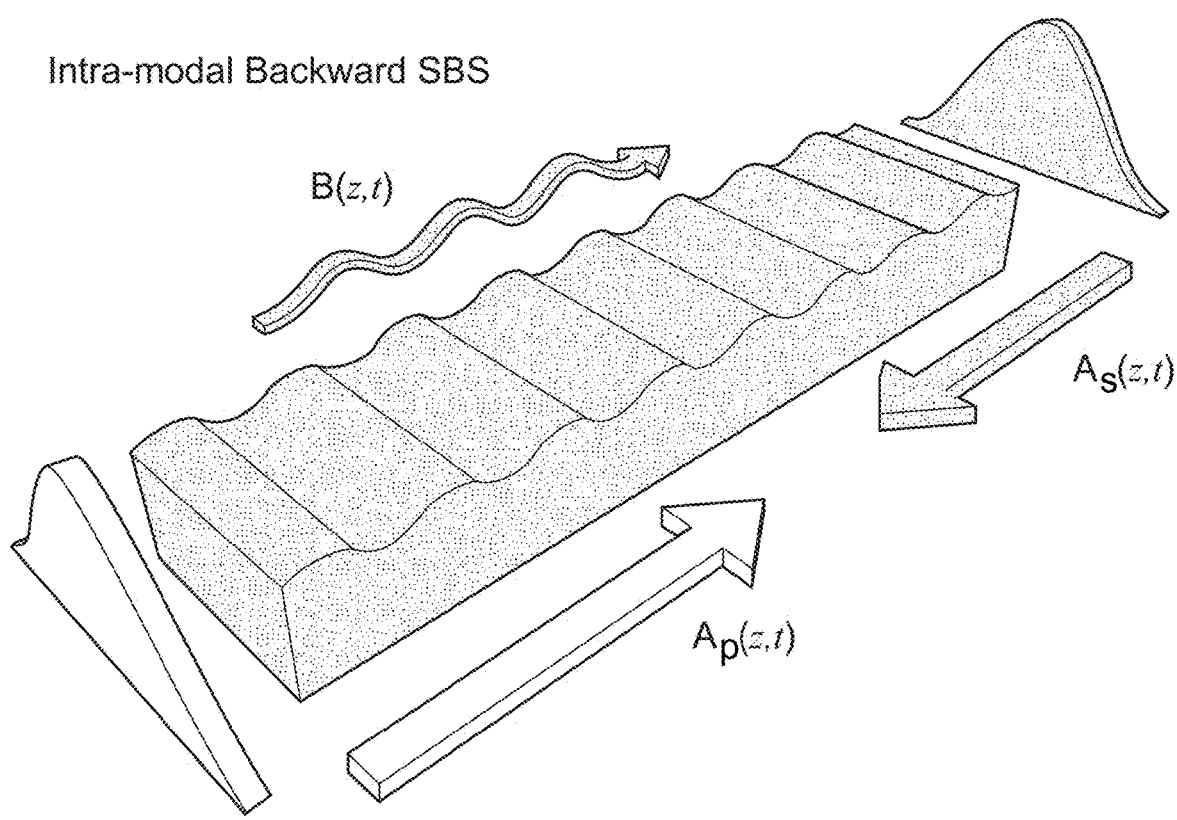
FIGS. 1A-1E illustrate various OM and AE devices in accordance with one or more embodiments of the present invention.
Figure 1B:
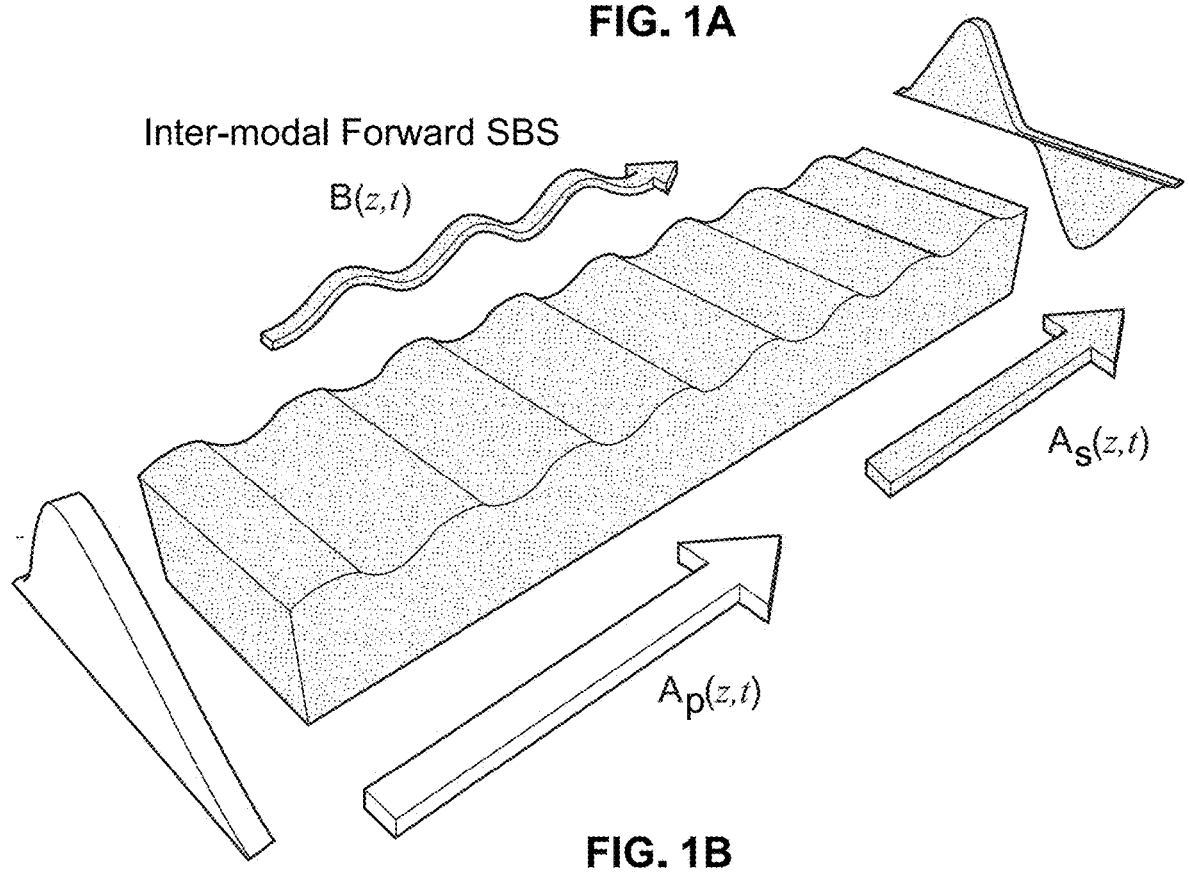
Figure 1C:
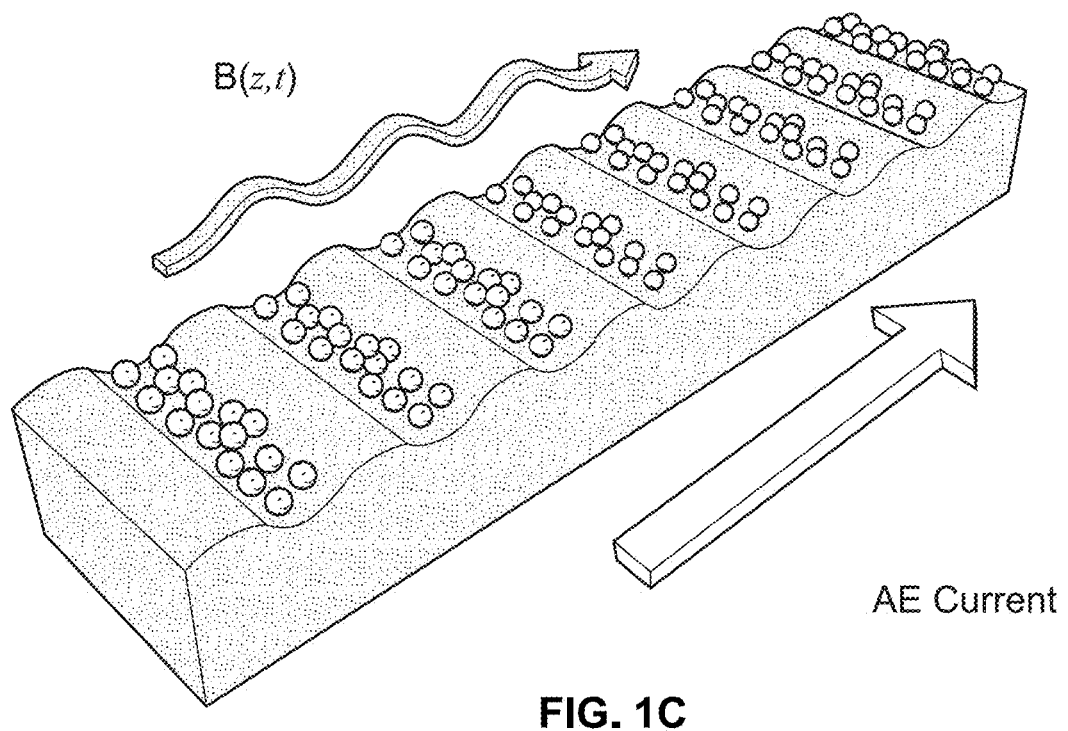
Figure 1D:
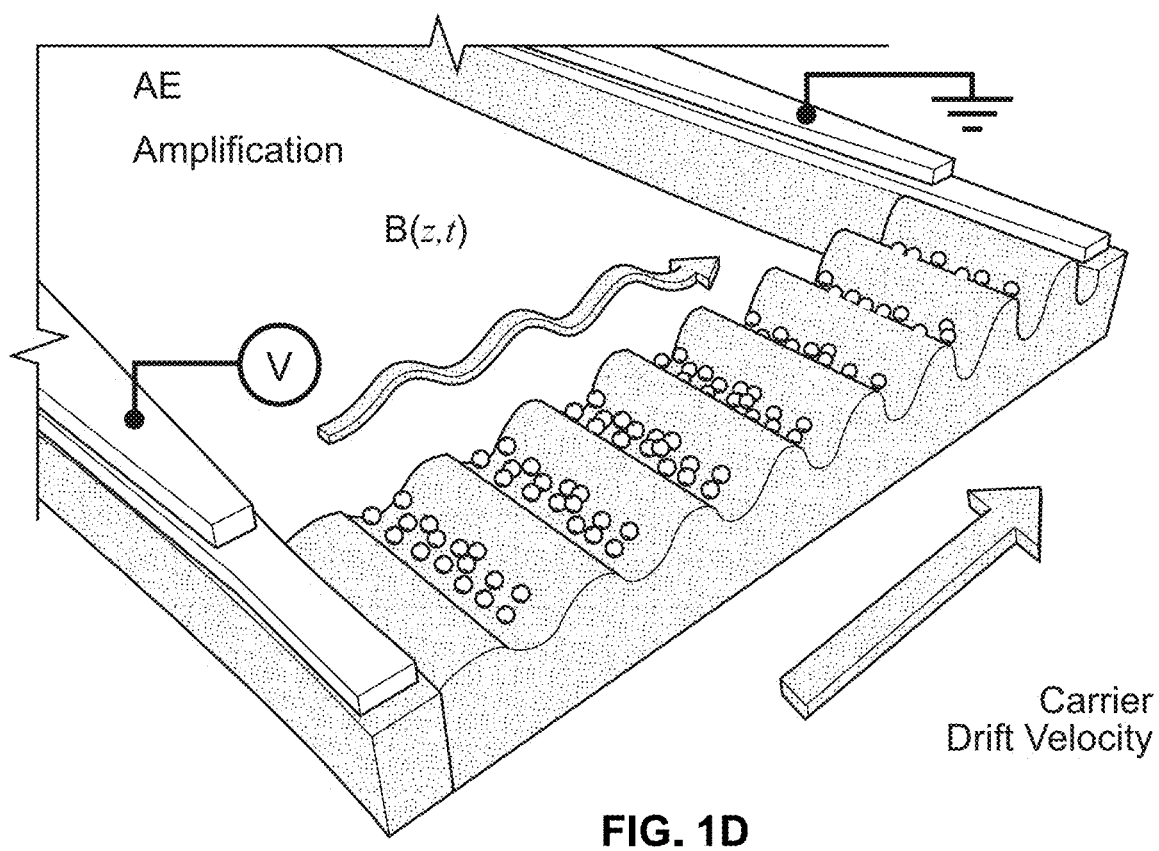
Figure 1E:
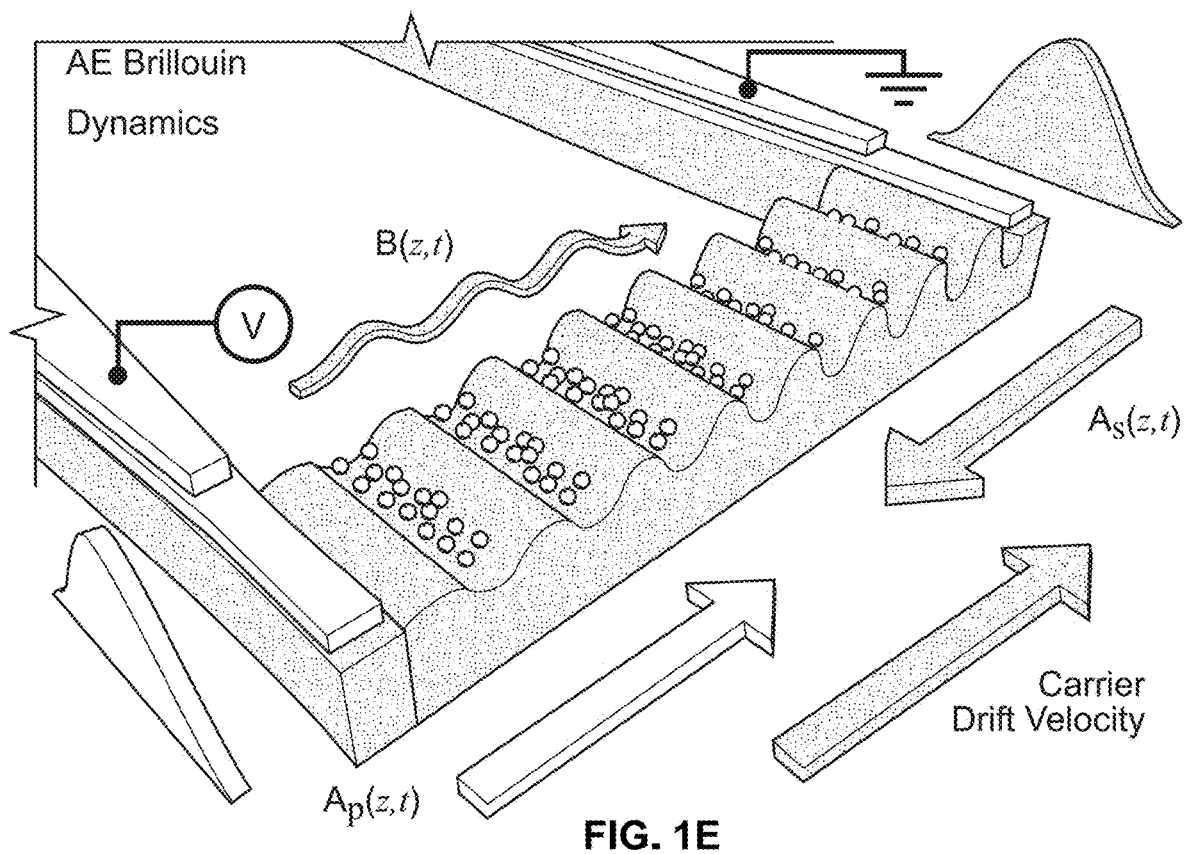

In this section, the effects of acoustoelectric (AE) phonon gain on the nonlinear susceptibility and spatio-temporal dynamics arising from optomechanical (OM) Brillouin interactions are described. FIGS. 1A and 1B illustrate backward and forward stimulated Brillouin scattering (SBS), respectively. FIG. 1C illustrates an acoustic wave creating an AE current. FIG. 1D illustrates AE gain due to an externally applied DC field. FIG. 1E illustrates a composite system that permits AE-enhanced SBS. As illustrated in FIGS. 1A-1E, the essential requirements are (1) the ability to guide optical and acoustic waves, (2) a traveling-wave OM system that supports non-zero Brillouin coupling, and (3) a material-compatible mechanism for AE gain. Combining these effects has profound ramifications on the nonlinear Brillouin susceptibility, thereby permitting radically enhanced and qualitatively distinct Brillouin device physics.

Using an InGaAsP on LiNbO$_3$ heterostructure waveguide as a concrete example, the following is a general analysis of the effects of AE phonon gain on the nonlinear susceptibility and spatio-temporal dynamics of OM Brillouin interactions. In this system, the Hamiltonian governing a stimulated (Stokes) OM Brillouin response can be expressed as:

$$H_B^{int} = \int dz (g_0 A_p^\dagger(z,t) A_s(z,t) B(z,t)) e^{i(q_0 - \Delta k_s)z} + H.c., \quad \text{(Eq. 1)}$$

where $A_p(z,t)$, $A_s(z,t)$, and $B(z,t)$ are the envelope operators for the pump, Stokes, and phonon fields, respectively, $g_0$ is the distributed OM coupling of the waveguide system, $q_0 - \Delta k_s$ represents the phase mismatch between the phonon and optical beat pattern, and H.c. is the Hermitian conjugate.

When phase-matching is satisfied, i.e., $q_0 - \Delta k_s = 0$, the Heisenberg equations of motion for backward SBS yield:

$$\frac{\partial \overline{B}}{\partial t} = -i(\Omega_m - \Omega)\overline{B} - \frac{\Gamma}{2}\overline{B} + v_{g,b}\frac{\partial \overline{B}}{\partial z} - ig_0^* \overline{A}_s^\dagger \overline{A}_p + \eta \quad \text{(Eq. 2A)}$$

$$\frac{\partial \overline{A}_p}{\partial t} = -\frac{\gamma_p}{2}\overline{A}_p + v_{g,p}\frac{\partial \overline{A}_p}{\partial z} - ig_0 \overline{A}_s \overline{B} + \varepsilon_p \quad \text{(Eq. 2B)}$$

$$\frac{\partial \overline{A}_s}{\partial t} = -\frac{\gamma_s}{2}\overline{A}_s - v_{g,s}\frac{\partial \overline{A}_s}{\partial z} - ig_0^* \overline{A}_p \overline{B}^\dagger + \varepsilon_s \quad \text{(Eq. 2C)}$$

Here $\overline{B}(z,t) = B(z,t)\exp(i\Omega t)$, $\overline{A}_p(z,t) = A_p(z,t)\exp(i\omega_p t)$, and $\overline{A}_s(z,t) = A_s(z,t)\exp(i\omega_s t)$ are the slowly varying phonon, pump, and Stokes envelopes in the rotating frame, with the condition $\Omega = \omega_p - \omega_s$; $v_{g,b}$, $v_{g,p}$, and $v_{g,s}$ represent the group velocities for the phonon, pump, and Stokes fields. The coefficient $g_0$ quantifies the distributed OM coupling arising from photoelastic and radiation-pressure effects. Note that Eqs. 2A-2C include the effects of dissipation in an open system and therefore require thermal and vacuum noise terms $\eta$, $\varepsilon_p$, and $\varepsilon_s$ according to the fluctuation-dissipation theorem.

When considering the impact of the AE phonon gain or loss on these dynamics, the AE effect can be described by the Hamiltonian:

$$H_{AE} = \hbar \sum_{l,} \int d\omega \int dz [\phi_{\omega l}^\dagger(z)\hat{\omega}\phi_{\omega l}(z) + (\kappa_{\omega,l}\phi_{\omega l}(z)B^\dagger(z) + H.c.)], \quad \text{(Eq. 3)}$$

where $\Phi_{\omega l}$ and B are the envelope operators for the electric potential and phonon fields, respectively, l labels bulk and surface modes of the potential, and $\kappa_{\omega,l}$, represented in terms of an overlap integral, quantifies the AE coupling. Within this coupled-envelope framework, the oscillation frequency of the mode $\hat{\omega} = \omega + v_d q_m - i v_d \cdot \nabla$ is operator valued, capturing the effects of temporal oscillations, current drift (given by $v_d = \mu E_{DC}$, where $E_{DC}$ is the applied drift field), and slowly-varying spatial dynamics of the potential amplitude. Here, $\omega$ denotes the normal mode frequency of the potential in the absence of a drift current of speed $v_d$ and $q_m$ is the carrier wavevector of the phonon and potential within the slowly-varying envelope approximation.

When an applied electric field causes free carriers to drift at a velocity greater than the acoustic wave, the AE effects produce a spatial phonon gain given by $$\alpha_{AE} = -\sum_l 2\pi |\kappa_{\omega - v_d q_m, l}|^2 / v_{g,b}.$$

As will be discussed below, the strength of the gain has a strong dependence on the AE overlap as well as the piezoelectric tensor. Noting that $|\kappa_{\omega - v_d q_m, l}|^2 \propto \gamma(v_m - v_d)$ where $\gamma$ is the scattering rate for the free electrons and $v_m$ is the phonon phase velocity, one recovers the essential features of AE gain. Specifically, amplification (excess attenuation) occurs when the drift velocity exceeds (falls below) the phonon phase velocity. In the case of a Brillouin-active OM system, the effects of AE gain and the accompanying velocity shift can be described by a modified complex dissipation $\Gamma \to \tilde{\Gamma}$ within the coupled envelope equations (Eqs. 2A-2C), where $\tilde{\Gamma} = 2i\Delta\Omega_{AE} + \Gamma - G_{AE}$. The parameter $G_{AE}$ quantifies the phonon gain as a time rate such that $G_{AE} = v_{g,b}\alpha_{AE}$, as discussed below.

One can incorporate the effects of AE phonon gain through a modification $G_{AE}$ to the intrinsic phonon dissipation rate $\Gamma$, given by $G_{AE} = v_b \alpha_{AE}$, where $\alpha_{AE}$ is the AE spatial phonon gain. To explore the impact of AE gain on the nonlinear Brillouin susceptibility, one can treat this phenomenon in the stiff pump regime, for the moment ignoring the noise terms, and move to the Fourier domain $$\left( f[\omega] = \int_{-\infty}^{\infty} f(t)\exp(i\omega t)dt \right),$$

which yields:

$$-i\omega \overline{A}_s[z,\omega] + \frac{\alpha v_{g,s}}{2}\overline{A}_s[z,\omega] + v_{g,s}\frac{\partial \overline{A}_s[z,\omega]}{\delta z} = \quad \text{(Eq. 4A)}$$

$$-ig_0^* \overline{A}_p \overline{B}^\dagger[z,\omega] \text{ and}$$

-continued $$i(\Omega - \Omega_m - \Delta\Omega_{AE} - \omega)\overline{B}[z,\omega] + \frac{\Gamma - G_{AE}}{2}\overline{B}[z,\omega] - v_{g,b}\frac{\partial \overline{B}[z,\omega]}{\delta z} = \quad \text{(Eq. 4B)}$$
$$-ig_0^*\overline{A}_p\overline{A}_s^\dagger[z,\omega],$$

where α is the spatial optical decay rate.

Focusing on the case in which the spatial coherence length of the phonon field, despite gain from the AE effect, is significantly shorter than that of the optical fields. The complementary limit will be discussed below. In this traditional Brillouin limit, the spatial dynamics of the phonon field can be adiabatically eliminated $$\left(\text{i.e., } v_{g,b}\frac{\partial \overline{B}[z,\omega]}{\delta z} \approx 0\right),$$

yielding:

$$\overline{B}[z,\omega] = -ig_0^*\chi_B^{AE}[\omega]\overline{A}_p\overline{A}_s^\dagger[z,\omega], \quad \text{(Eq. 5)}$$

where the AE modified phonon susceptibility is given by $$\chi_B^{AE}[\omega] = \left(i(\Omega - \Omega_m - \Delta\Omega_{AE} - \omega) + \frac{\Gamma - G_{AE}}{2}\right)^{-1}.$$

Through the stimulated Brillouin process, this modification translates into an AE Brillouin nonlinear optical susceptibility $X_s^{AEB[\omega]}$ in the dynamics of the Stokes wave such that:

$$-i\omega\overline{A}_s[z,\omega] + \frac{\alpha_s v_{g,s}}{2}\overline{A}_s[z,\omega] + v_{g,s}\frac{\partial \overline{A}_s[z,\omega]}{\delta z} = \chi_S^{AEB}[\omega]\overline{A}_s[z,\omega], \quad \text{(Eq. 6)}$$

where $X_s^{AEB[\omega]} = |g_0|^2|\overline{A}_p|^2 X_B^{AE}[\omega]$.

Thus, through this AE-enhanced stimulated Brillouin process, a Stokes field with initial conditions $\overline{A}_s[0,\omega]$ is amplified as:

$$\overline{A}_s[z,\omega] = \overline{A}_s[0,\omega]\exp\left[\left(\frac{-i\omega}{v_{g,s}} - \frac{\alpha}{2} + \frac{G_B P\Gamma\chi_B^{AE*}[\omega]}{4}\right)z\right], \quad \text{(Eq. 7)}$$

where the Brillouin gain coefficient-power product $G_B P$ is given by $G_B P = 4|g_0|^2|\overline{A}_p|^2/(\Gamma v_{g,s})$. An additional figure of merit is the dimensionless Brillouin gain coefficient-power-length product $G_B PL$, which in practical AE Brillouin-based devices preferably has a value of at least 0.1. In the Brillouin gain coefficient-power-length product $G_B PL$, $G_B$ is the Brillouin gain coefficient (in watts$^{-1}$ meters$^{-1}$), P corresponds to a pump power (in watts), and L corresponds to a length of the interaction region (in meters). Inspecting the resonance condition (i.e., ω=0; $\Omega=\Omega_m+\Delta\Omega_{AE}$, reveals a gain (loss) factor that is exponentially increased (decreased) by the AE modified phonon dissipation, specifically:

$$\frac{|\overline{A}_s[z,0]|^2}{|\overline{A}_s[0,0]|^2} = \exp\left[\left(G_B P\frac{\Gamma}{\Gamma - G_{AE}} - \alpha\right)z\right]. \quad \text{(Eq. 8)}$$

It should be noted that in practical AE Brillouin-based devices, the dimensionless factor $$\frac{\Gamma}{\Gamma - G_{AE}},$$

found in the exponent of Eq. 8, where $G_{AE}$ is the AE phonon gain rate (in sec$^{-1}$) and $\Gamma$ is the intrinsic phonon loss rate (in sec$^{-1}$), preferably has a value of at least 0.5. It should further be noted that in practical AE Brillouin-based devices, the dimensionless factor $$G_B PL \times \frac{\Gamma}{\Gamma - G_{AE}}$$

preferably has a value of at least 0.2.

As such, the ability to modify the nonlinear susceptibility through AE coupling enables in situ reconfigurability of the Brillouin gain.

Theoretical Performance of AE Brillouin-Based Devices

Acoustoelectric phonon gain directly modifies the nonlinear optical susceptibility through an enhancement in the Brillouin gain coefficient, which is inversely proportional to the phonon dissipation rate. These enhanced dynamics have profound implications for Brillouin device physics and attainable performance—especially in chip-scale systems where the accessible levels of Brillouin gain have been historically limited.

The performance of Brillouin-based amplifiers, used in a range of signal processing, filtering, and optical nonreciprocity applications, can be radically improved as AE phonon gain dramatically reduces the effective phonon lifetime. This effective exponential gain enhancement is highlighted by the power dynamics of a small-signal Stokes wave, given by:

$$P_s[z] = P_s[0]\exp\left[\left(G_B P\frac{\Gamma}{\Gamma - G_{AE}} - \alpha\right)z\right]. \quad \text{(Eq. 9)}$$

FIGS. 2A-2D illustrate the calculated logarithmic amplification enhancement as a function of normalized AE gain for an OM Brillouin system with typically chip-scale parameters. Without AE gain, an OM Brillouin system may struggle to yield even net amplification, i.e., sufficient Brillouin gain to compensate for propagation loss, but with it, 50 dB or more of dynamically reconfigurable amplification may be possible. Moreover, this degree of AE gain is accompanied by an increasingly narrow gain bandwidth (from ~35 MHz to <~300 kHz), enabling extremely selective narrowband operations in RF-photonic filtering applications.

Figure 2A:
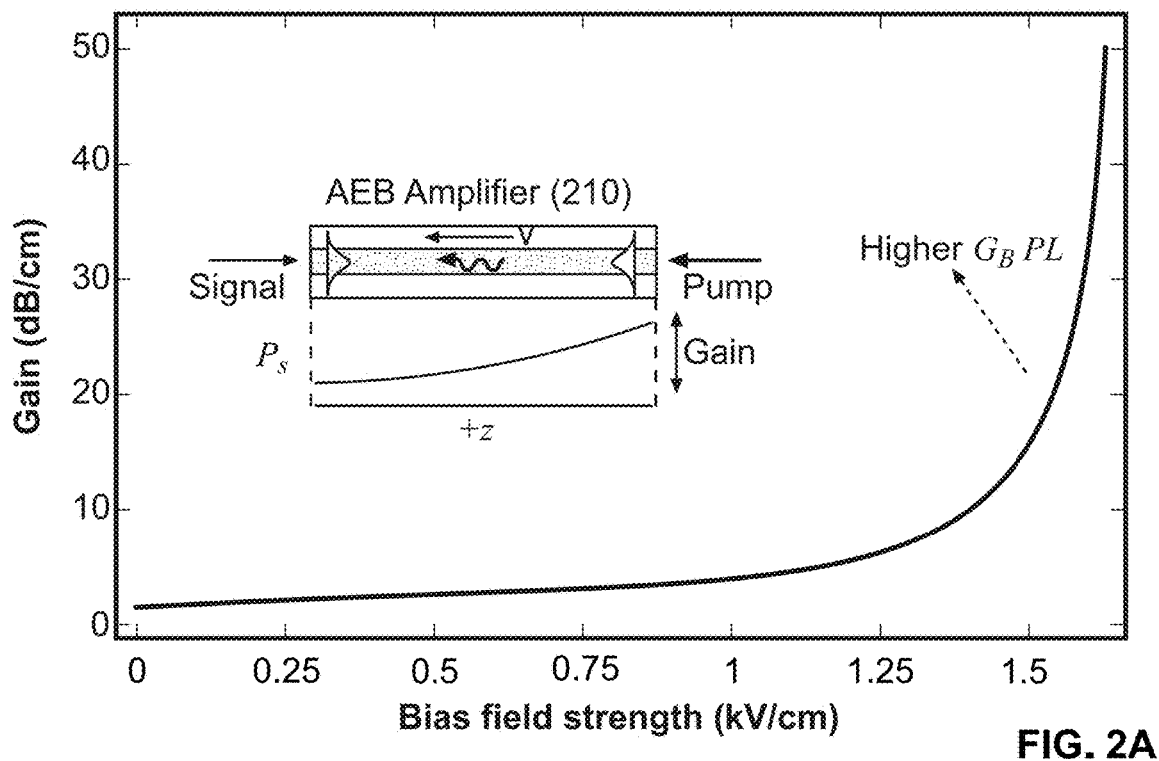
FIGS. 2A-2D illustrate calculated results for various characteristics as a function of bias field strength for devices in accordance with one or more embodiments of the present invention.
Figure 2B:
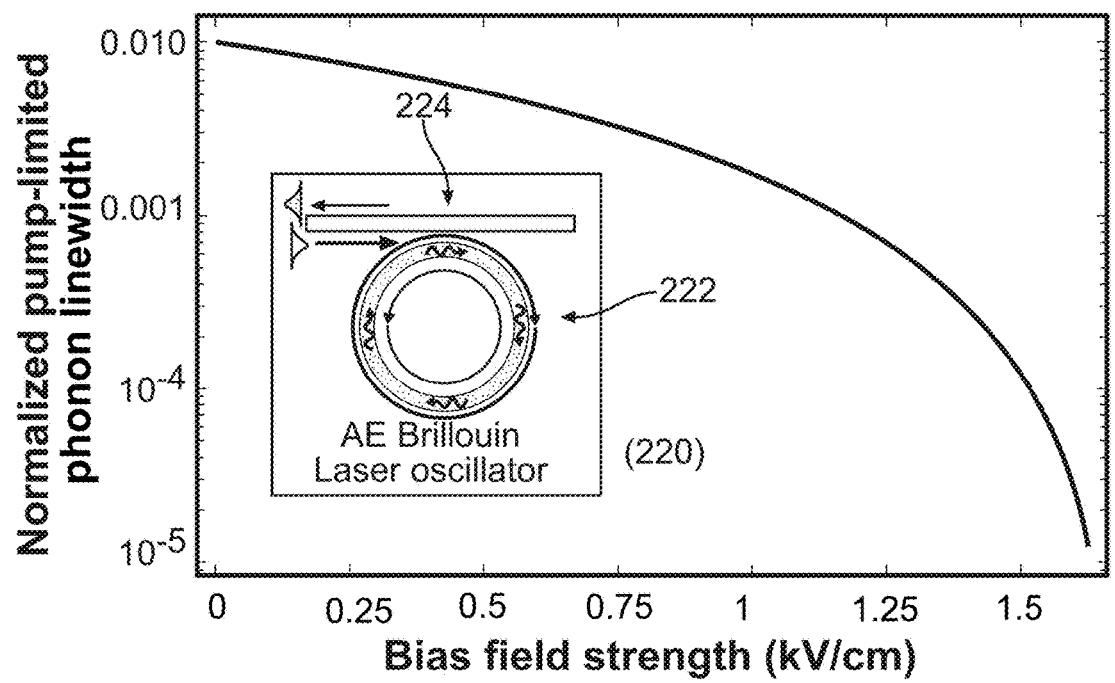

More specifically, FIGS. 2A-2D illustrate the calculated performance enhancement from AE interactions for various archetypal Brillouin devices in the enhanced traditional limit. FIG. 2A illustrates the calculated gain improvement in a backward SBS amplifier as a function of bias field strength. As illustrated in the inset of FIG. 2A, the amplifier 210 has a linear configuration with a length L. FIG. 2B illustrates the calculated potential improvement in pump-limited phonon linewidth for an AE-enhanced Brillouin laser oscillator operating in the phonon linewidth narrowing regime. Here the phonon linewidth is not limited by Schawlow-Townes narrowing. The phonon linewidth is normalized by the pump linewidth. As illustrated in the inset of FIG. 2B, the Brillouin laser oscillator 220 is in an optically resonant configuration, which includes an optical resonator in the form of a ring oscillator waveguide 222 adjacent to and optically coupled to a linear waveguide 224. The ring oscillator waveguide 222 has an effective propagation length $L_{\mathit{eff}}$. Note that while the AE-enhanced Brillouin laser oscillator illustrated in FIG. 2B includes an optical resonator in the form of ring oscillator waveguide 222, other optical resonators may be employed. For example, the optical resonator in other embodiments of the AE-enhanced Brillouin laser oscillator may be a "racetrack" resonator, such as that disclosed in Otterstrom et al. See N. T. Otterstrom et al., "Resonantly enhanced nonreciprocal silicon Brillouin amplifier," Optica, vol. 6, no. 9, pp. 1117-1123, the contents of which are incorporated herein by reference.

Figure 2C:
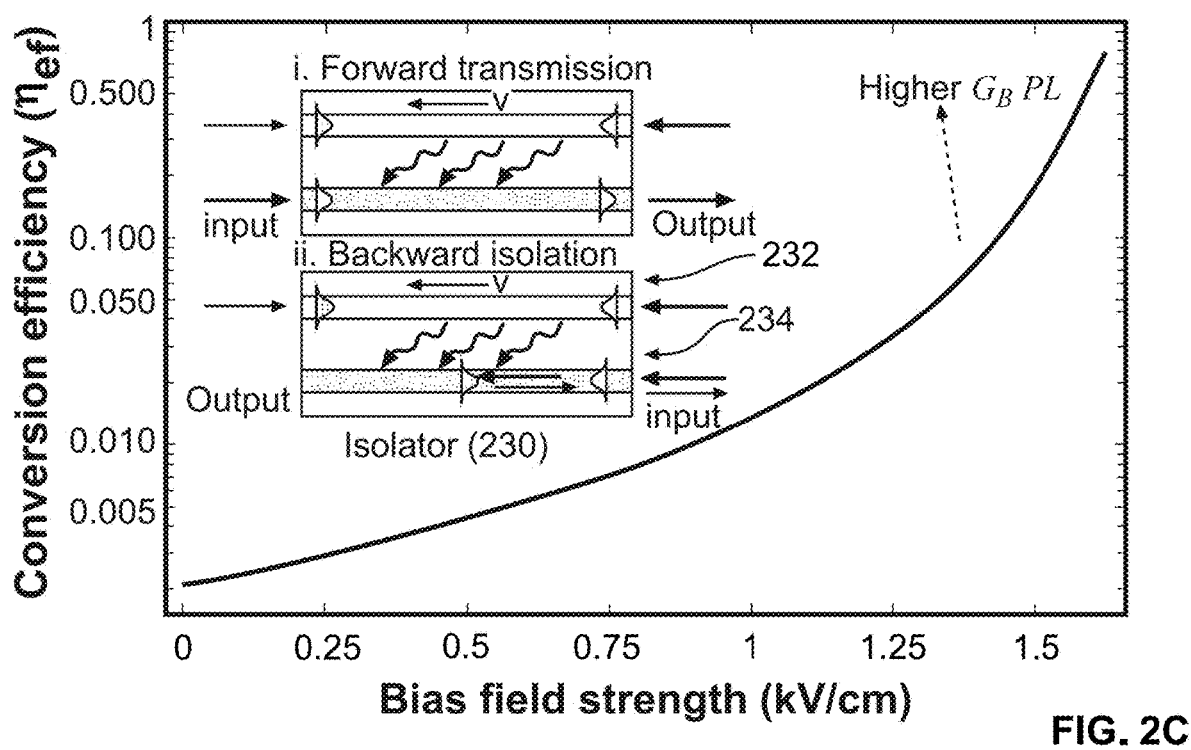
Figure 2D:
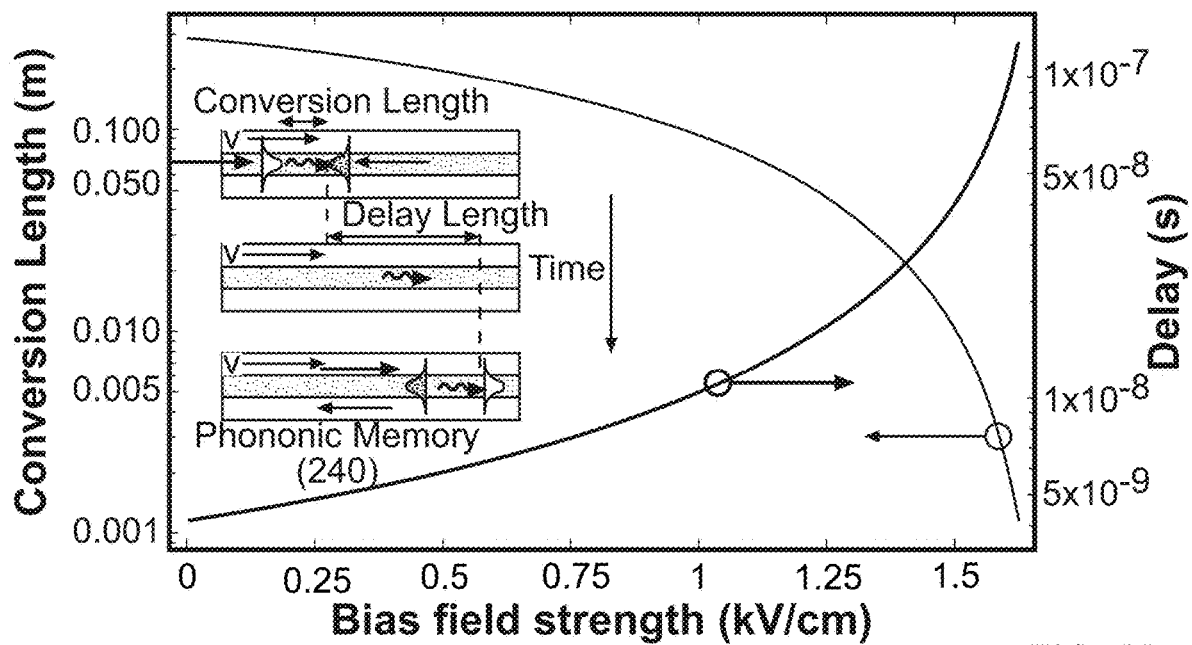

FIG. 2C illustrates the calculated nonreciprocal scattering efficiency for a Brillouin-based AE-enhanced isolator 230 as a function of bias field strength. The particular implementation of this enhanced nonreciprocal scattering process is illustrated in the upper and lower insets, and requires OM waveguides that are coupled phononically. Counter-propagating pump and signal waves in a drive waveguide (light gray, 232) set up an acousto-optic (AO) grating in a modulator waveguide (dark gray, 234) that can be enhanced by the AE effect. In the upper inset of FIG. 2C, when light at the pump frequency, i.e., a modulated signal, is injected into the modulator waveguide in the forward direction, it is not phase-matched to, and thus passes unaffected by, the AO grating. By contrast, in the backward direction, illustrated in lower inset of FIG. 2C, the modulated signal experiences complete AO scattering providing effective optical isolation. FIG. 2D illustrates the calculated phonon delay enhancement and conversion length reduction due to the AE effect for a Brillouin-based phononic memory 240. As illustrated in the inset, pump (light gray) and write (dark gray) fields set up an AE-enhanced acoustic-grating within the phononic memory 240, with a conversion efficiency of 1 (i.e., one phonon from one photon) over the so-called conversion length (gray). At the same time, the AE effect increases the effective delay length for the phononic memory 240. After the delay, the write information can be recovered by the pump pulse that, upon AO scattering, creates a back-propagating read pulse (dark gray).

The dynamically reconfigurable phonon dissipation rates and Brillouin gain made possible by AE-enhanced Brillouin interactions allow modification of the dynamics of Brillouin oscillator systems in ways that otherwise might not be possible. For example, AE phonon gain directly reduces the pump power required to reach self-oscillation. Specifically, the threshold in this case is given by:

$$P_{th}^{AEB} = \frac{\Gamma - G_{AE}}{\Gamma} P_{th}. \quad \text{(Eq. 10)}$$

In this way, provided the AE interaction can produce net phonon amplification, AE gain enables near arbitrary control of the self-oscillation threshold. For example, a drift field of 1.62 kV/cm applied to an InGaAsP on LiNbO$_3$ structure would reduce the threshold condition by approximately 2 orders of magnitude.

Second, AE gain allows precise shaping of the linewidth narrowing dynamics of Brillouin laser oscillators. The well-known ability of a Brillouin laser oscillator to produce ultra-low noise self-oscillation (even in cases where the pump is spectrally much broader) is contingent on a sufficient asymmetry between the optical and acoustic temporal dissipation rates. Specifically, systems in which the optical dissipation rate exceeds that of the acoustic, and vice versa, can produce Schawlow-Townes acoustic (optical) linewidth narrowing. As such, the ability to reconfigure the phonon dissipation rate through the AE effect permits flexible in situ control of the linewidth narrowing dynamics.

For oscillator applications, it may be desirable to achieve high degrees of spectral compression of the microwave-frequency phonon field. In the case of a linewidth limited by pump noise, this "noise eating" process can be quantified by the ratio of phonon linewidth ($\Delta_{v_B}$) to the input pump linewidth ($\Delta_{v_p}$), given by:

$$\frac{\Delta v_B}{\Delta v_p} = \frac{1}{\left(1 + \frac{\gamma}{\Gamma - G_{AE}}\right)^2}, \quad \text{(Eq. 11)}$$

where $\gamma$ is the optical dissipation rate. FIG. 2B illustrates the calculated pump-limited phonon linewidth as a function of bias field strength, revealing dramatic improvement relative to the case of a Brillouin laser oscillator with intrinsic Brillouin parameters. Further, this material stack may be compatible with quantum well systems that yield optical gain in addition to AE phonon gain. In principle, this should allow complete control over the photonic and phononic dissipation rates, enabling dynamics ranging from the extreme optical linewidth narrowing to acoustic linewidth narrowing regimes.

Acoustoelectric enhanced Brillouin processes may also be the key to significant performance improvement in chip-scale non-reciprocal technologies based on traveling-wave optomechanics. Some of the most promising broadband technologies for on-chip isolators rely on inter-modal waveguide acousto-optics, in which a moving acoustic Bragg grating produces unidirectional optical mode conversion due to a nonreciprocal phase-mismatch. However, it has been challenging to achieve the scattering efficiencies necessary to produce large contrast optical nonreciprocity with low insertion loss.

However, with AE phonon gain, the scattering efficiency $\eta_{ef}$ (in the case of lossless optical fields) can be improved as:

$$\eta_{ef} = \tanh^2\left(\frac{G_B P L \Gamma}{4(\Gamma - G_{AE})}\right). \quad \text{(Eq. 12)}$$

Acoustoelectrically enhanced transduction may bring unity efficiencies within reach even for systems with intrinsic scattering efficiencies of approximately $10^{-3}$. Moreover, the AE effect yields attenuation and consequently additional suppression of unwanted backward propagating phonons, further enhancing the degree of accessible non-reciprocity. As a result, the AE-enhanced Brillouin interactions may play a key role in enabling practical AO on-chip isolators.

Control of the phonon dissipation through AE phonon gain can significantly enhance the performance of Brillouin-based memory and OM delay. The most apparent improvement is the ability to extend the phonon lifetime $\tau(\propto 1/\Gamma)$, and hence the delay time by:

$$\tau_{AEB} = \tau\left(\frac{\Gamma}{\Gamma - G_{AE}}\right). \quad \text{(Eq. 13)}$$

A less obvious, but equally useful benefit of increasing the phonon lifetime, is that one can achieve unity photon-phonon conversion lengths, for example in an OM memory, over much shorter distances. The conversion length scales as:

$$L_{AEB} = L\left(\frac{\Gamma - G_{AE}}{\Gamma}\right). \quad \text{(Eq. 14)}$$

The calculated normalized delay (gray) and conversion lengths (black) are illustrated in FIG. 2D. For the material structure under consideration, tunable chip light storage delay durations of more than 100 μs may be within reach (corresponding to ~20 km of fiber optic path length), surpassing existing approaches by orders of magnitude.

At the AE induced coherent Brillouin (ACB) limit, the phonon propagation due to the AE-enhanced phonon lifetime cannot be ignored. Consider an interaction region in which both the optical and acoustic waves can be considered lossless, with the later enabled by AE gain that compensates for any phonon propagation loss. Under these conditions, the spatial equations of motion, i.e., steady state in time, become:

$$v_{g,s}\frac{\partial \overline{A}_s[z,\omega]}{\delta z} = -ig_0^*\overline{A}_p\overline{B}^+[z,\omega] \text{ and} \quad \text{(Eq. 15A)}$$

$$v_{g,b}\frac{\partial \overline{B}[z,\omega]}{\delta z} = -ig_0^*\overline{A}_p[z,\omega]. \quad \text{(Eq. 15B)}$$

Note that, as a vector quantity, the phonon group velocity $v_{g,b}$ can have a profound impact on the resulting coupled dynamics.

Equations 15A, 15B can be decoupled through differentiation, yielding:

$$\frac{\partial^2 \overline{A}_s[z]}{\partial z^2} = \frac{|g|^2|\overline{A}_p|^2}{v_{g,s}v_{g,b}}\overline{A}_s[z] \quad \text{(Eq. 16A)}$$

$$\frac{\partial^2 \overline{B}[z]}{\partial z^2} = \frac{|g|^2|\overline{A}_p|^2}{v_{g,s}v_{g,b}}\overline{B}[z] \quad \text{(Eq. 16B)}$$

For a forward propagating phonon field, i.e., co-propagating with the Stokes field as illustrated in FIG. 1B, the solution for $\overline{A}_s[z]$ and $\overline{B}[z]$ take the form:

$$\overline{A}_s[z] = A \sinh[\kappa z] + B \cosh[\kappa z] \text{ and} \quad \text{(Eq. 17A)}$$

$$\overline{B}[z] = C \sinh[\kappa z] + D \cosh[\kappa z], \quad \text{(Eq. 17B)}$$

where $$\kappa^2 = \left(|g_0|^2|\overline{A}_p|^2 / (v_{g,s}v_{g,b})\right),$$

and A, B, C, and D are determined by the initial conditions.

The particular case of an input Stokes wave ($\overline{A}_s[0] = \overline{B}[0] = 0$) yields the solutions:

$$\overline{A}_s[z] = \overline{A}_s[0]\cosh(\kappa z) \text{ and} \quad \text{(Eq. 18A)}$$

$$\overline{B}[z] = -\frac{ig_0^*\overline{A}_p}{|g_0^*||\overline{A}_p|}\sqrt{\frac{v_{g,s}}{v_{g,b}}}\overline{A}_s^\dagger[0]\sinh(\kappa z). \quad \text{(Eq. 18B)}$$

Figure 3A:
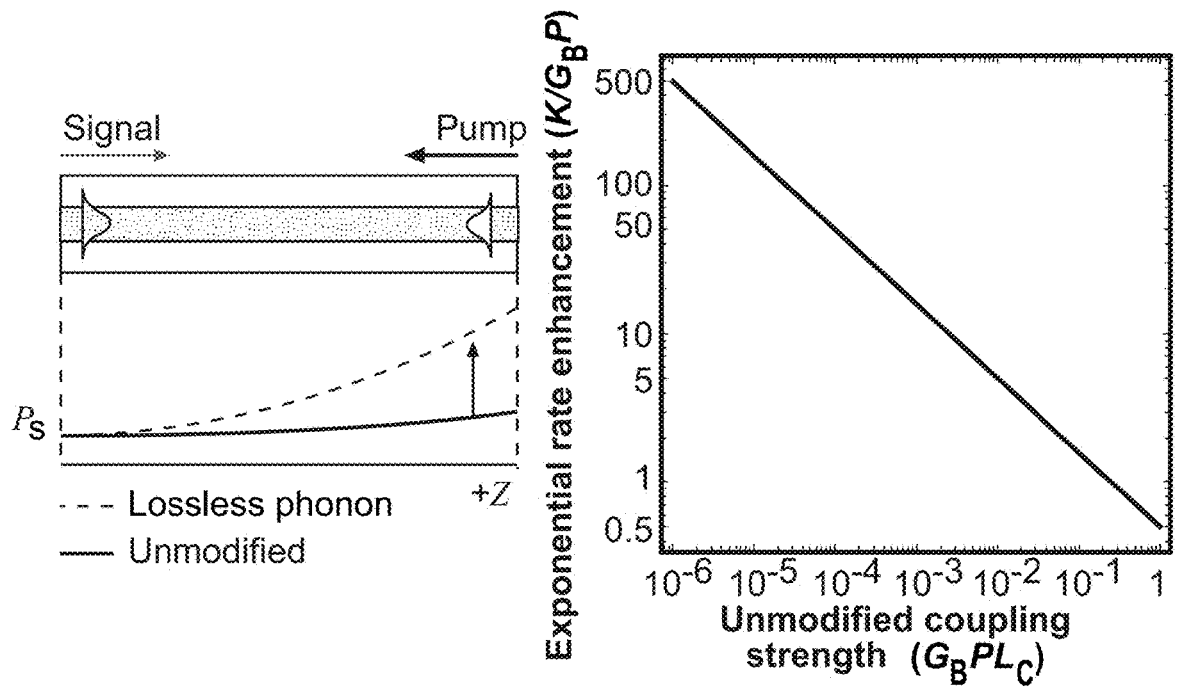
FIGS. 3A-3C illustrate calculated results for gain as a function of various parameters in accordance with one or more embodiments of the present invention.
Figure 3B:
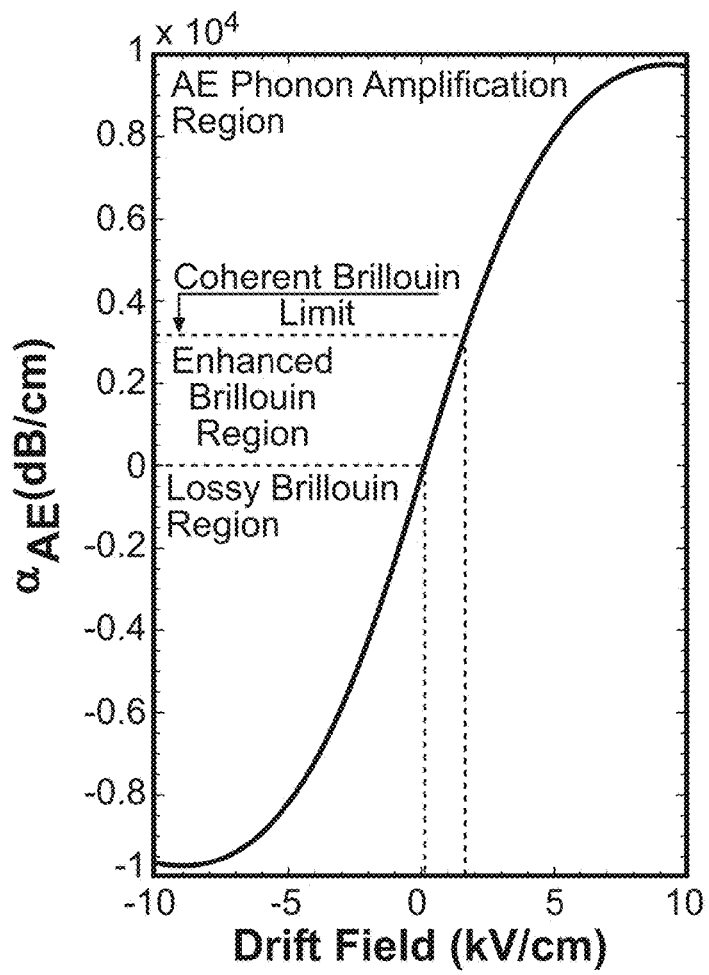

The dynamics in this AE-induced lossless case resemble those of parametric $\chi^{(2)}$ processes, which are quite distinct from those of traditional SBS in scattering. In particular, there is a qualitatively different gain-like behavior. The nontrivial AE gain enhancement can be characterized by the ratio of the standard gain per unit length in the parametric ($\kappa$) to traditional ($G_B P$) limits, which is:

$$\frac{\kappa}{G_B P} = \frac{\Gamma}{4|g_0|}\sqrt{\frac{\hbar\omega_p v_{g,p} v_{g,s}}{P v_{g,b}}}, \quad \text{(Eq. 19)}$$

where $\Gamma$ is the phonon dissipation rate in the absence of AE gain. Note that the ACB regime is particularly advantageous, from a perspective of accessible optical gain, in the case of relatively low optical pump powers and OM coupling rates, as illustrated in FIG. 3A. Specifically, FIG. 3A illustrates the calculated exponential growth rate enhancement ($\kappa/G_B P$) by entering the parametric regime as a function of unmodified coupling strength ($G_B P L_c$). FIG. 3A also illustrates the calculated potential improvement by operating in the lossless regime, which is accentuated in the cases of low intrinsic Brillouin coupling. FIG. 3B illustrates the calculated AE amplification as a function of the applied drift field, with three distinct dynamics regions (lossy Brillouin, enhanced Brillouin, and AE amplification).

The OM dynamics of this AEOP limit diverge even more significantly from the traditional SBS limit when considering a counter-propagating phonon field, which is required for backward SBS. Switching sign of the phonon group velocity yields an imaginary coupling $\kappa = i|\kappa|$, and the solution becomes Rabi-like as:

$$\overline{A}_s[z] = \overline{A}_s[0]\cos(|\kappa|z) \text{ and} \quad \text{(Eq. 20A)}$$

$$\overline{B}[z] = -\frac{ig_0^*\overline{A}_p}{|g_0^*||\overline{A}_p|}\sqrt{\frac{v_{g,s}}{v_{g,b}}}\overline{A}_s^\dagger[0]\sin(|\kappa|z). \quad \text{(Eq. 20B)}$$

Figure 3C:
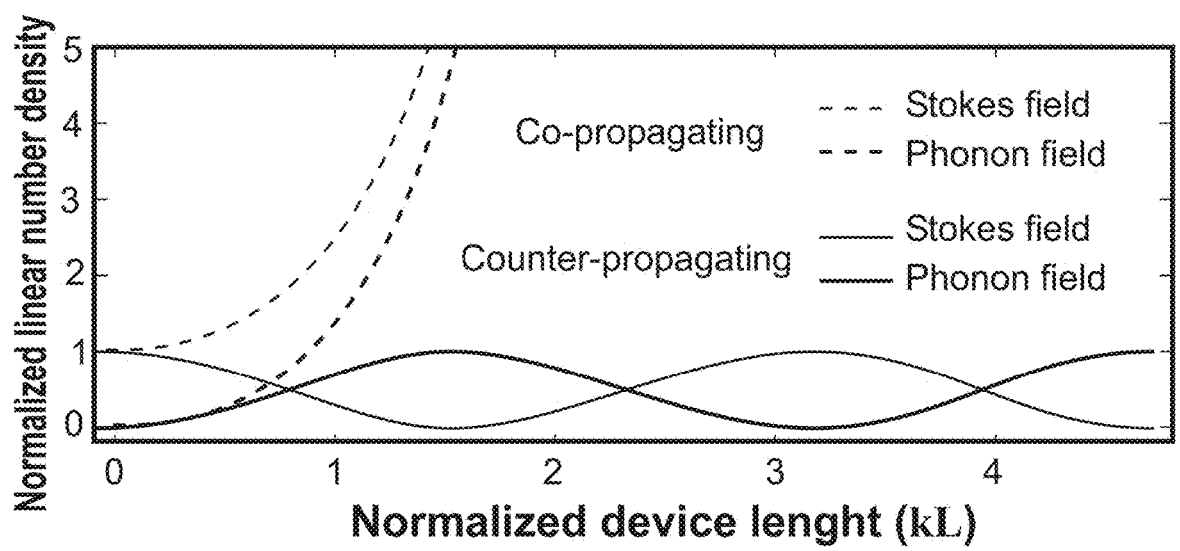

In this case, AE gain can lead to strong-coupling-like OM dynamics, a radical change from the parametric gain behavior of the co-propagating case, as illustrated in FIG. 3C. Specifically, FIG. 3C illustrates the calculated normalized number density as a function of device length. Disparate parametric-like dynamics emerge in the case of co- and counter-propagating Stokes and phonon fields, as described by Equations 18A, 18B, 20A, and 20B.

While the above discussion covered Brillouin amplifiers, Brillouin laser oscillators, acousto-optic isolators, and OM delays/memories, other devices are possible. These devices include, among others, so-called "slow light" devices, narrowband AE Brillouin optical/radio frequency (RF) photonic filters, etc.

Physical System Design

The realization of a physical system for implementing AE Brillouin devices requires a piezoelectric material near both free carriers and an optically transparent material to thereby optimize the three-wave mixing process involving two optical modes (pump and Stokes) and one acoustic mode. The inventors have previously demonstrated a high-performance AE platform based on lithium niobate ($LiNbO_3$) and epitaxial indium gallium arsenide (InGaAs) thin films. The first demonstrations of this AE platform were performed in pulsed-mode operation using Y-cut LiNbO$_3$ and 41° Y-cut LiNbO$_3$ wafers bonded to a thin epitaxial InGaAs semiconductor. See, L. Hackett et al., "High-gain leaky surface acoustic wave amplifier in epitaxial InGaAs on lithium niobate heterostructure," Applied Physics Letters, vol. 114, art. no. 253503 (2019); and L. Hackett et al., "Towards single-chip radiofrequency signal processing via acoustoelectric electron-phonon interactions," Nature Communications, vol. 12, art. no. 2769 (2021), the contents of each which are incorporated herein by reference. These platforms utilized the leaky SAW mode, which has a high piezoelectric coupling coefficient ranging from 17-24%. These AE devices were operated in pulsed-mode due to the poor heat dissipation of the LiNbO$_3$ wafers. To improve the heat dissipation and operate the AE devices in continuous wave (CW) operation, a thin film Y-cut LiNbO$_3$ on a silicon (Si) substrate was used. See, L. Hackett et al., "High-gain leaky surface acoustic wave amplifier in epitaxial InGaAs on lithium niobate heterostructure" and L. Hackett et al., "Towards single-chip radiofrequency signal processing via acoustoelectric electron-phonon interactions."

The inclusion of phosphorus in the epitaxial InGaAs semiconductor creates an optically transparent material at telecommunications wavelengths, i.e., ~1.5 µm. Optical systems using InGaAsP have found applications in quantum well lasers, diode lasers, and optical amplifiers, thereby providing the option of additional devices and functionality.

While the following discusses the use of an InGaAsP/LiNbO$_3$/Si material structure, other material structures may be employed. For example, a highly desirable property of the semiconductor layer is that it be formed of a high-mobility semiconductor material, which is met, for example, by InGaAs and InGaAsP. Similarly, a highly desirable property of the piezoelectric layer is that it be formed of a material having a strong piezoelectric coefficient, which is met, for example, by LiNbO$_3$, AlN, and ScAlN. Likewise, a highly desirable property of the substrate is that it be formed of a highly thermally conductive material having a greater speed of sound (relative to the piezoelectric and semiconductor layers), for example, sapphire, Si, and SiC. Example overall material structures meeting these requirements include piezoelectric semiconductors such as GaN, GaAs, and GaP, or semiconductor-piezoelectric hybrids (like the example InGaAsP/LiNbO$_3$/Si material structure discussed below), such as GaAs/LiNbO$_3$ or co-integrated AlN in SOI-based silicon photonics.

In other embodiments, material structures that utilize forms of non-piezoelectric-based AE coupling, for instance deformation potential coupling, enable AE Brillouin physics in an even broader class of semiconductors. As an example, Ge may be used in these devices. Of particular note in these embodiments is that the material structure is now monolithic, as the substrate, the deformation potential layer (the replacement for the piezoelectric layer), and the semiconductor layer may all be formed of Ge.

Figure 4A:
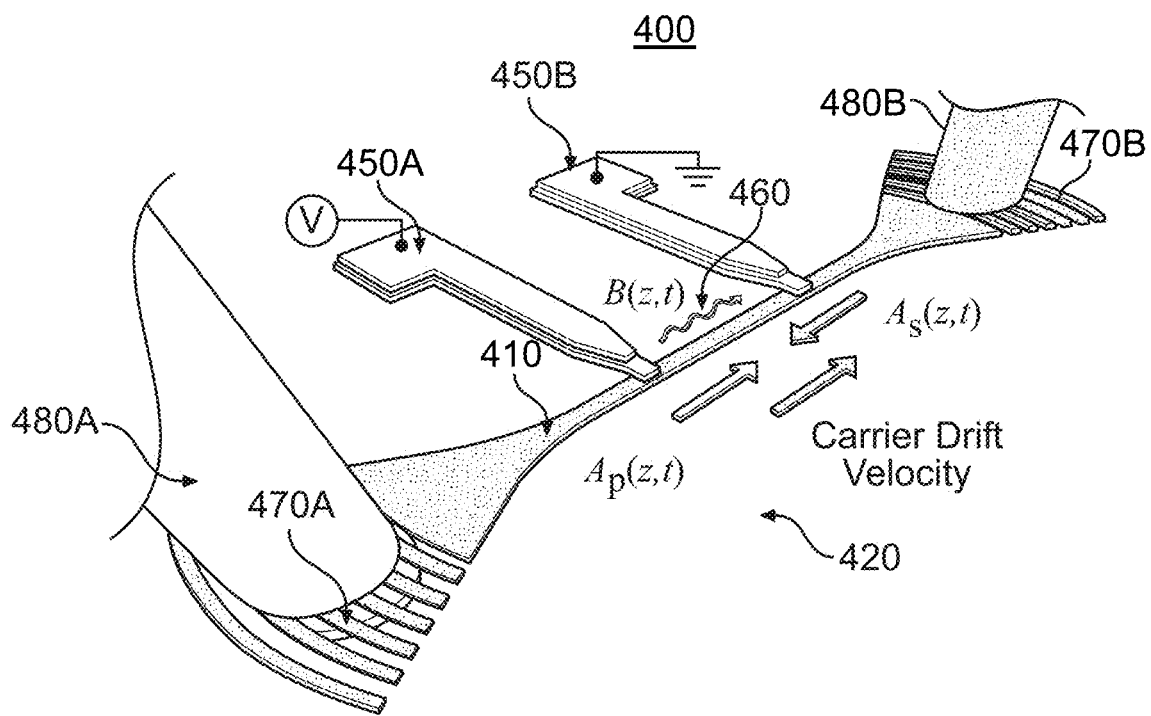
FIGS. 4A-4C illustrate the physical system for AE Brillouin devices in accordance with one or more embodiments of the present invention.

To assist in understanding the physical system design methodology, the following provides a summary of an exemplary physical device 400, illustrated in FIG. 4A. FIG. 4A also illustrates the functionality of each layer within the exemplary device. An InGaAsP semiconductor layer 410 is used as an optical waveguide in addition to providing the free carriers for the AE interaction. The InGaAsP semiconductor layer 410 is located on a substrate 420, which includes at least a LiNbO$_3$ layer 430, and optionally a silicon substrate 440.

Figure 4B:
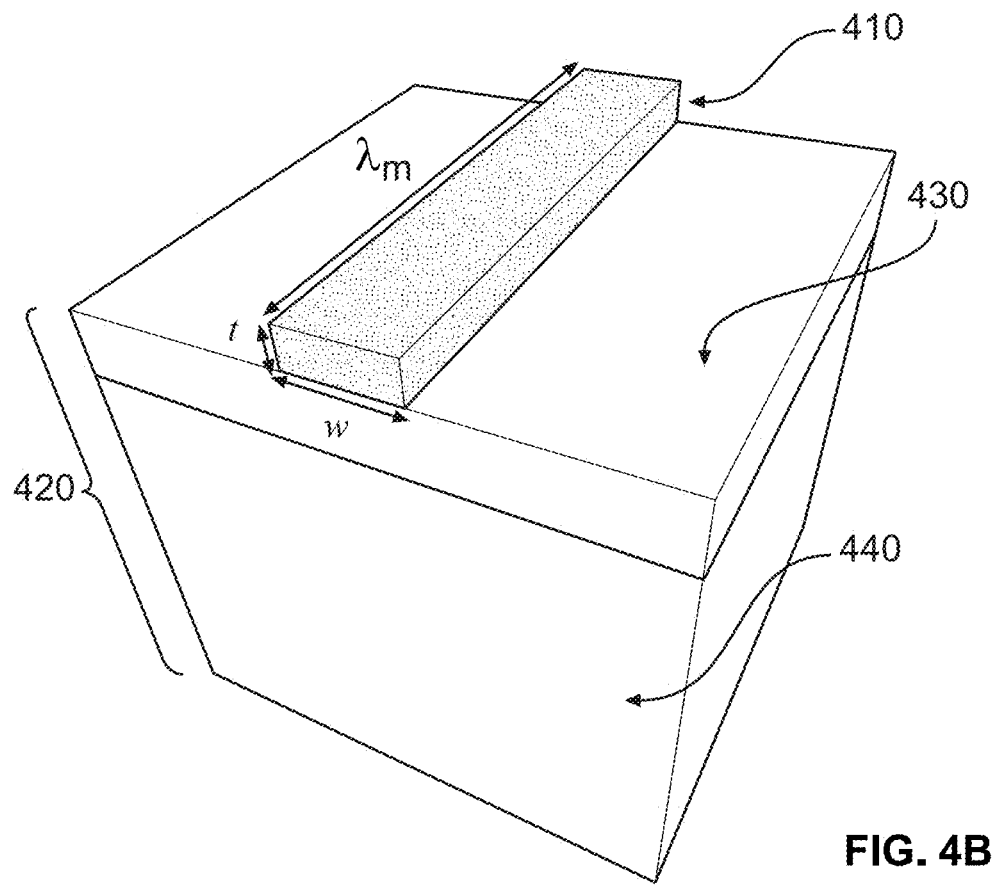

While the device 400, illustrated in FIGS. 4A and 4B, places the optical waveguide and the LiNbO$_3$ layer 430 directly on the silicon substrate 440, this is not required. For example, in other embodiments, a portion of the optical waveguide and the LiNbO$_3$ layer 430 are suspended above the silicon substrate 440, thereby reducing optical and phononic losses to the silicon substrate 440. This suspended configuration is illustrated, for example, in FIG. 1(b) of Otterstrom et al., referenced above. This suspended configuration typically employs a suspension layer, for example, SiO$_2$, to raise and separate the heterostructure formed of the piezoelectric LiNbO$_3$ layer 430 and the InGaAsP semiconductor layer 410 from the silicon substrate 440. The tethers of this suspended configuration are formed in the piezoelectric LiNbO$_3$ layer 430. It should be noted that with this suspended configuration, the order of the piezoelectric and semiconductor layers in the heterostructure may be inverted, i.e., the piezoelectric layer may be formed on the semiconductor layer. As a specific example, a Si semiconductor layer/waveguide is suspended over a silicon substrate with an SiO$_2$ suspension layer, wherein an AlN piezoelectric layer is formed as a cladding over the Si semiconductor layer/waveguide. In both the standard and inverted heterostructure layer orderings, the combined piezoelectric and semiconductor layers serve multiple purposes, including guiding the optical and acoustic modes while simultaneously providing AE and optomechanical coupling.

A pair of contacts 450A, 450B are in electrical contact with the InGaAsP semiconductor layer 410 and define an interaction region 460 therebetween. A pair of optical grating couplers 470A, 470B are included on opposite ends of the InGaAsP semiconductor layer 410 to permit optical coupling of optical signals 480A, 480B to and from the InGaAsP semiconductor layer 410. The acoustic mode is guided within a heterostructure formed by the InGaAsP semiconductor layer 410 and the LiNbO$_3$ layer 430, with the Si substrate 440 assisting in heat dissipation for CW operation. As illustrated in FIG. 4B, the exemplary physical device 400 employs the epitaxial InGaAsP semiconductor layer 410 bonded to the Y-cut LiNbO$_3$ layer 430 on the underlying silicon substrate 440. This exemplary physical device 400 offers two benefits. First, the free carrier density in the InGaAsP semiconductor layer 410 necessary for strong AE gain is small enough to not induce appreciable optical loss. Second, for the relevant acoustic modes, the longitudinal and shear acoustic phase velocity in the InGaAsP semiconductor layer 410 is smaller than in the LiNbO$_3$ layer 430, allowing for a high degree of acoustic confinement.

As noted above, various materials can be used for the substrate, the piezo electric layer, and the semiconductor layer. For example, in some embodiments, the piezoelectric layer and the semiconductor layer may be formed of the same material, with this material forming the waveguide. In this case, the single material serves multiple purposes, including guiding the optical and acoustic modes while simultaneously providing AE and optomechanical coupling. Examples of materials that can satisfy these combined requirements include acoustoelectric semiconductor materials such as GaAs, GaP, GaN, and Ge. The substrate in these structures must have a greater speed of sound and a lower optical index of refraction (relative to the combined piezoelectric/semiconductor layer). As with the heterostructure configuration with its piezoelectric and semiconductor layers, the unitary structure formed of acoustoelectric semiconductor material may also be employed in the suspended configuration with, for example, a SiO$_2$ suspension layer.

The OM coupling strength is a function of the overlap between the optical mode and acoustic mode, while the AE coupling strength is a function of the overlap between the acoustic mode, the piezoelectric potential, and the free carriers. Therefore, careful consideration must be made when designing the optical and acoustic modes to ensure good overlap between all domains, resulting in strong OM and AE coupling.

Figure 4C:
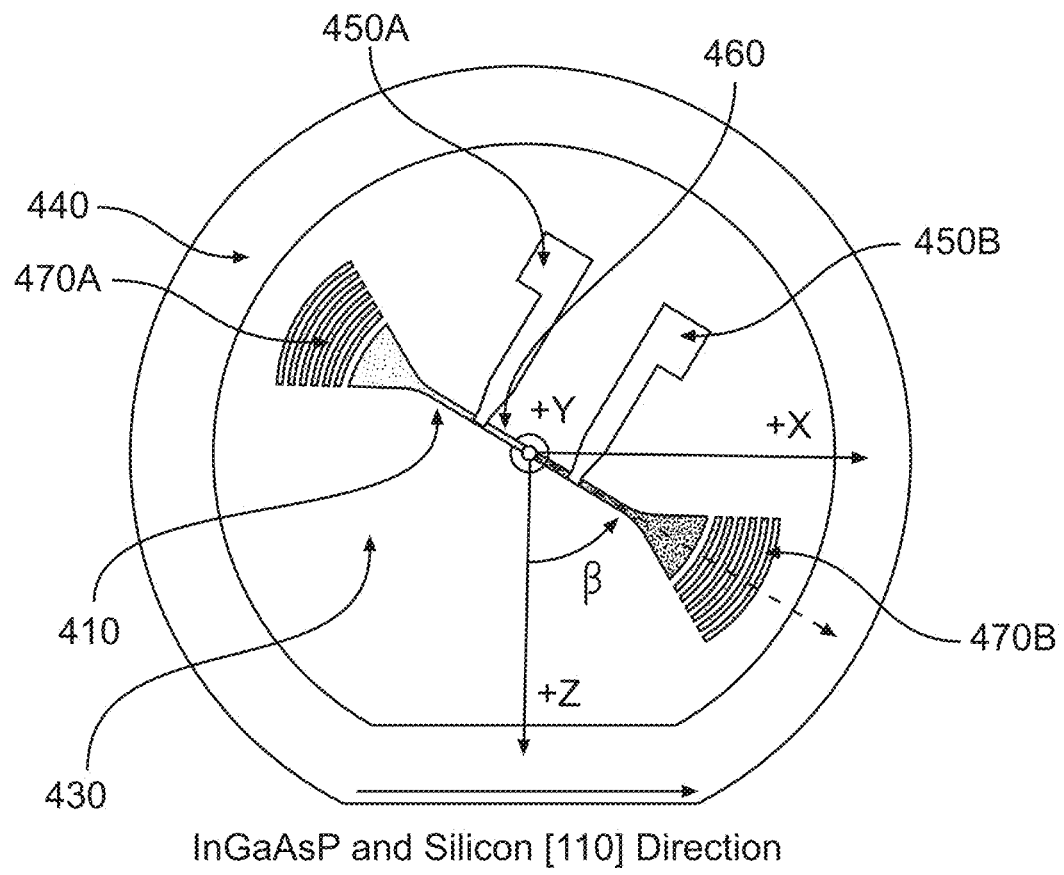

FIGS. 4B and 4C illustrate some key geometric parameters to consider when designing an AE Brillouin device. The width (w) and thickness (t) of the InGaAsP semiconductor layer 410 in its waveguide region not only determines the confinement and effective index of the optical modes, but it also determines the lateral and vertical confinement of the acoustic mode in the heterostructure formed of the InGaAsP semiconductor layer 410 and the LiNbO$_3$ layer 430. The acoustic wavelength ($\lambda_m$) sets the operating acoustic frequency and acoustic mode shape, depending on the relative size between the acoustic wavelength and waveguide dimensions. Finally, since this physical system includes anisotropic materials, the propagation angle ($\beta$) in the device plane must be considered. This propagation angle not only determines the optical axis of the LiNbO$_3$, but also the piezoelectric coupling strength of the acoustic mode.

Figure 5:
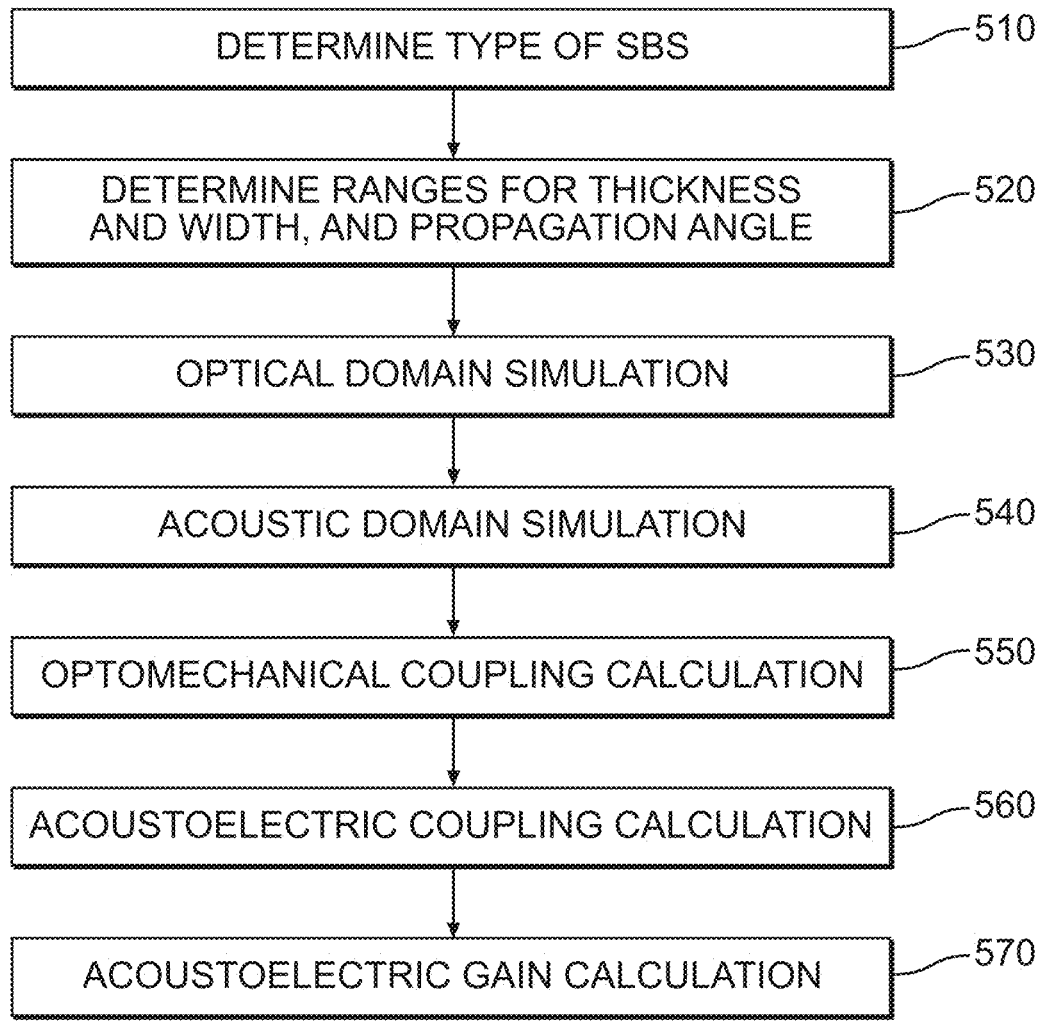
FIG. 5 illustrates a flowchart of the overall design procedure for AE Brillouin devices in accordance with one or more embodiments of the present invention.

The general outline for the design procedure 500 is described below and illustrated in flowchart form in FIG. 5. In step 510, the type of SBS is determined to apply the appropriate acoustic and optical phase matching conditions. The three types of SBS considered are inter-modal forward wave interactions, intra-modal backward wave interactions, and intra-modal forward wave interactions. For each case of SBS, the following design parameters must be considered to cover the full design space: optical mode pair, propagation angle, InGaAsP waveguide width, and InGaAsP waveguide thickness. The pair of optical modes used for the pump and Stokes photons will determine the acoustic wavelength needed for phase matching. Ranges for both the thickness (t) and width (w) of the waveguide are selected in step 520, along with the propagation angle ($\beta$). The propagation angle chosen is largely influenced by the optical and acoustic properties of the LiNbO$_3$ thin film. Longitudinal strains have high piezoelectric coupling parallel to the Z-axis, whereas shearing strains have a high piezoelectric coupling parallel to the X-axis. This corresponds to either a 0° or a 90° propagation angle, respectively. These two propagation angles also correspond to the extraordinary or ordinary optical axis in the LiNbO$_3$ film. Since the optimal waveguide width strongly depends on the chosen acoustic mode, the range of simulated waveguide widths must be carefully considered. If the waveguide width is too small relative to the acoustic wavelength, the acoustic mode is not well confined. If the waveguide width is too large, there is a small overlap between the acoustic and optical modes. In this example physical system, the desired acoustic modes have frequencies between 500 MHz and 10 GHz and the optimal InGaAsP waveguide widths fall within the modeled range of 0.4 µm to 1.75 µm. The Y-cut LiNbO$_3$ thin film has a thickness of 5 µm and the modeled InGaAsP waveguide thickness ranges from 100 nm to 300 nm to remain a single mode waveguide in the vertical direction.

After the range of design parameters is set, the simulations are carried out in the following order: optical domain simulation is carried out in step 530, acoustic domain simulation is carried out in step 540, OM coupling calculations are carried out in step 550, step 560 includes AE coupling calculations, while the AE gain is calculated in step 570. The 2D optical domain simulation of step 530 is used to identify the effective indices of the pump and Stokes photons and use them to calculate the acoustic wavelength required for phase matching in step 540. Additionally, the normalization terms and electric displacement fields for the pump and Stokes photons are extracted for use in calculating the OM coupling rates in step 550. The 3D acoustic domain simulation is used to solve for the free and grounded eigenfrequencies of the acoustic modes, which are subsequently used when calculating the piezoelectric coupling constant in step 560 and AE gain in step 570. The normalization terms and strain profiles are extracted for each acoustic mode for use when calculating the OM coupling rates in step 550. Using the extracted field values, the following OM coupling rates are calculated in step 550: photoelastic coupling in the InGaAsP waveguide, photoelastic coupling in the surrounding LiNbO$_3$, radiation pressure coupling of the waveguide, and total OM coupling rate. Finally, the sets of acoustic modes from the free and grounded simulations are correlated to calculate the piezoelectric coupling coefficient of each acoustic mode in step 560. The piezoelectric coupling rates are then used to calculate the AE gain for each acoustic mode as a function of applied drift field in step 570.

Given a physical system, the first step in designing an AE Brillouin device is to examine the relationship between the optical modes and the required acoustic wavelength. Brillouin scattering processes require momentum and energy conservation between the created and annihilated optical and acoustic modes. The momenta of the optical and acoustic modes are related to their wave numbers, which for the optical mode is given as:

$$k_{p,s} = n_{eff}^{p,s} k_{p,s} = n_{eff}^{p,s} \frac{2\pi}{\lambda_{p,s}}, \quad \text{(Eq. 21)}$$

where $k_{p,s}$ is the wave number, $n_{eff}^{p,s}$ is the optical mode's effective index, and $\lambda_{p,s}$ is the wavelength of the pump (p) and Stokes(s) optical modes.

Similarly, the wave number of the acoustic mode ($q_m$) is given as:

$$q_m = \frac{2\pi}{\lambda_m}, \quad \text{(Eq. 22)}$$

where $\lambda_m$ is the acoustic wavelength.

In the case of a forward scattering inter-modal Stokes process, a higher energy pump photon creates a phonon and lower energy Stokes photon. The momentum and energy conservation can be expressed in terms of the photon and phonon wave numbers as:

$$q_m = k_p(\omega_p) - k_s(\omega_s), \text{ and} \quad \text{(Eq. 23)}$$

$$\Omega_m = \omega_p - \omega_s, \quad \text{(Eq. 24)}$$

where $\Omega_m$, $\omega_p$, and $\omega_s$ are the frequencies of the phonon, pump photon, and Stokes photon, respectively. Using Equations (21) and (22), the momentum conservation in Equation (23) can be solved for the acoustic wavelength needed in inter-modal Brillouin scattering. Since the acoustic frequency is much smaller than the optical frequencies ($\Omega_m \ll \omega_{p,s}$), both the pump and Stokes photons can be approximated as having the same optical wavelength. The expression for the required acoustic wavelength is given as:

$$\lambda_m = \frac{\lambda_p}{n_{eff}^p - n_{eff}^s}. \quad \text{(Eq. 25)}$$

Due to the relatively small difference between the pump and Stokes effective mode indices, the acoustic wavelength for inter-modal forward Brillouin scattering is typically larger than the optical wavelength.

Figure 6A:
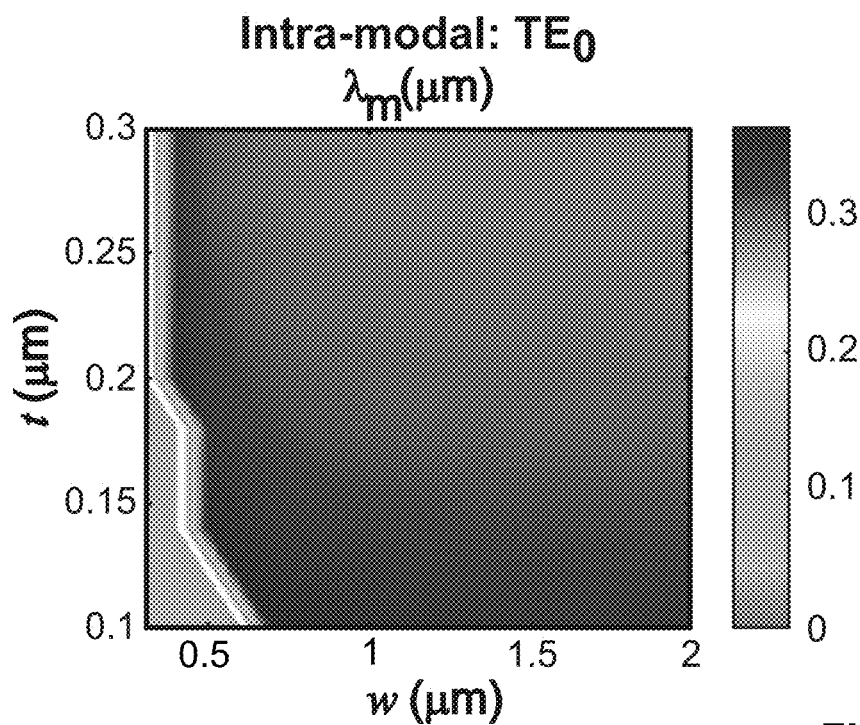
FIGS. 6A-6E illustrate the calculated required acoustic wavelengths needed for intra- and inter-modal forward Brillouin scattering as a function of the modeled waveguide geometry for AE Brillouin devices in accordance with one or more embodiments of the present invention.
Figure 6B:
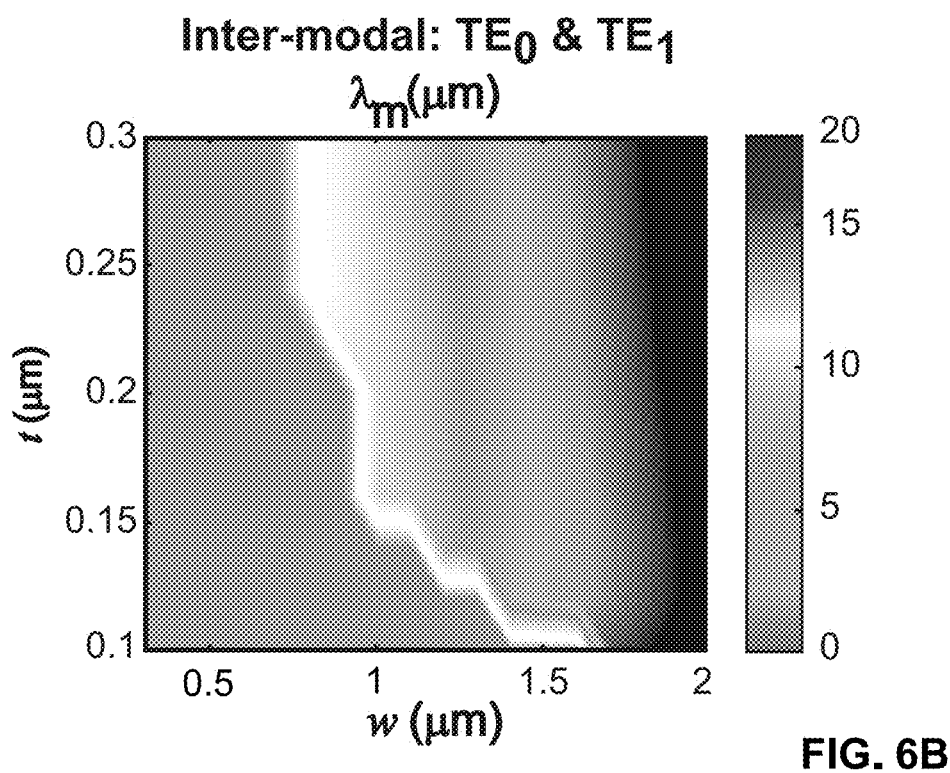
Figure 6C:
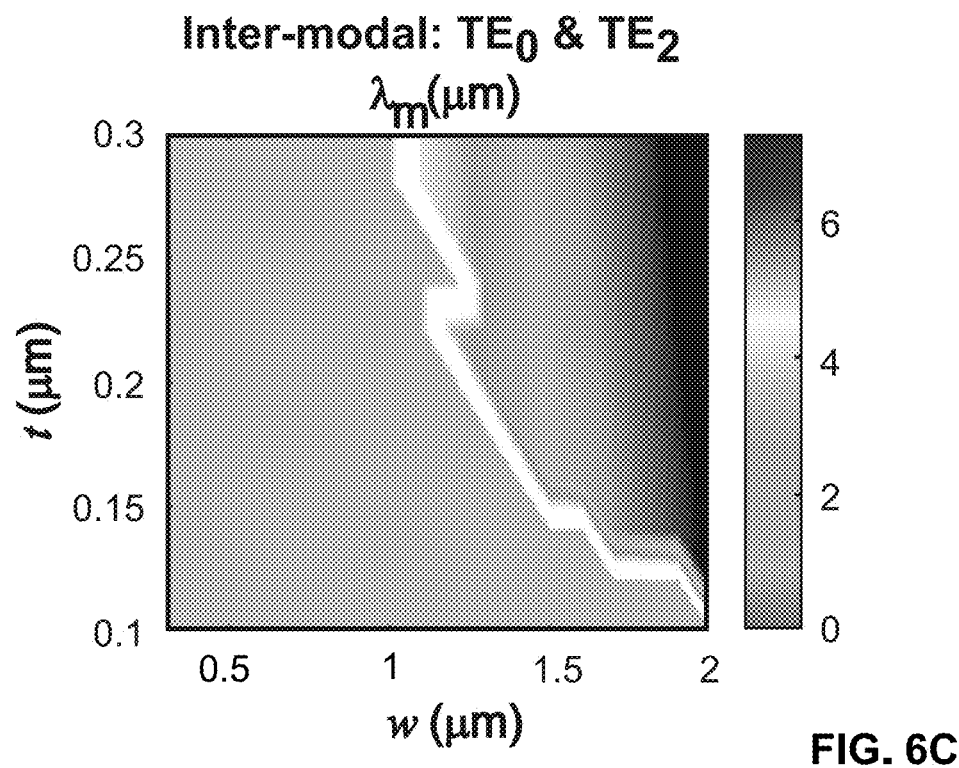
Figure 6D:
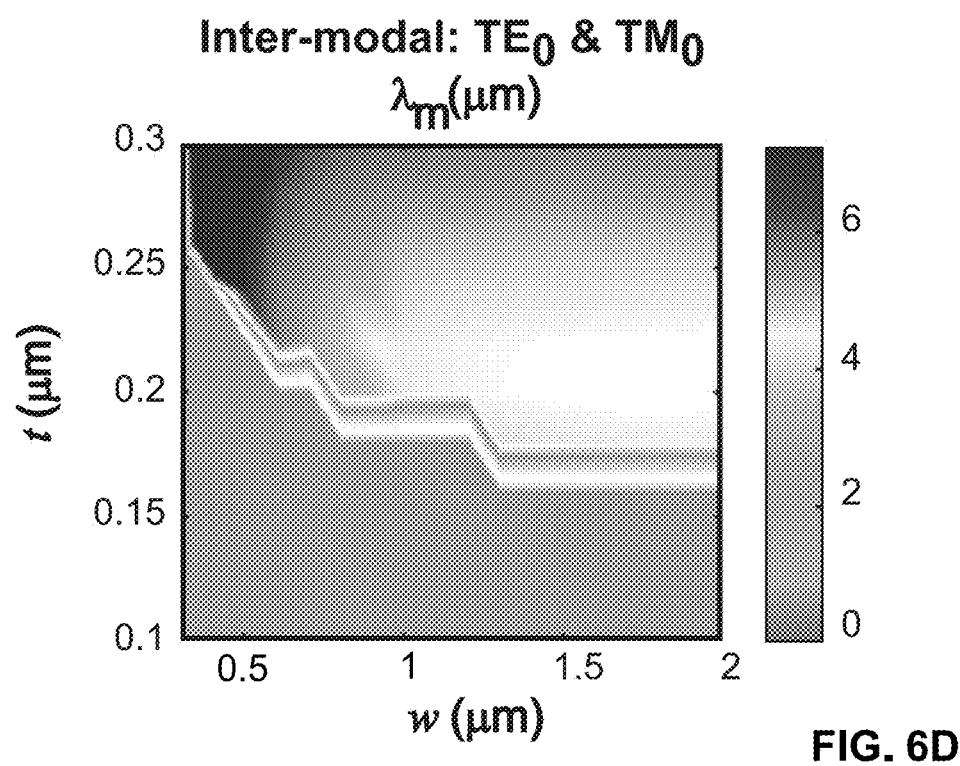
Figure 6E:
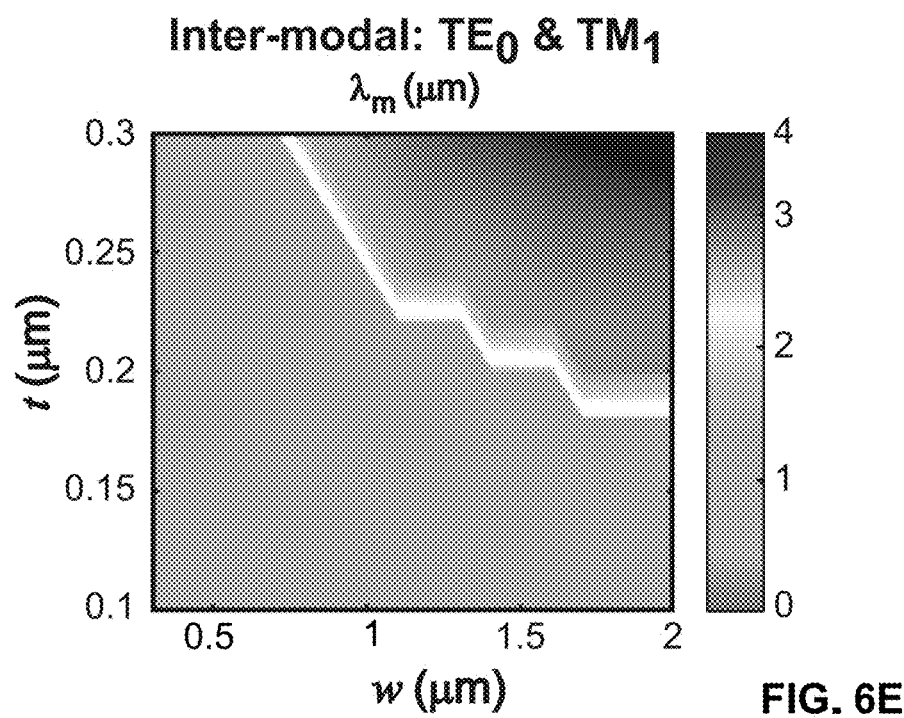
Figure 7:
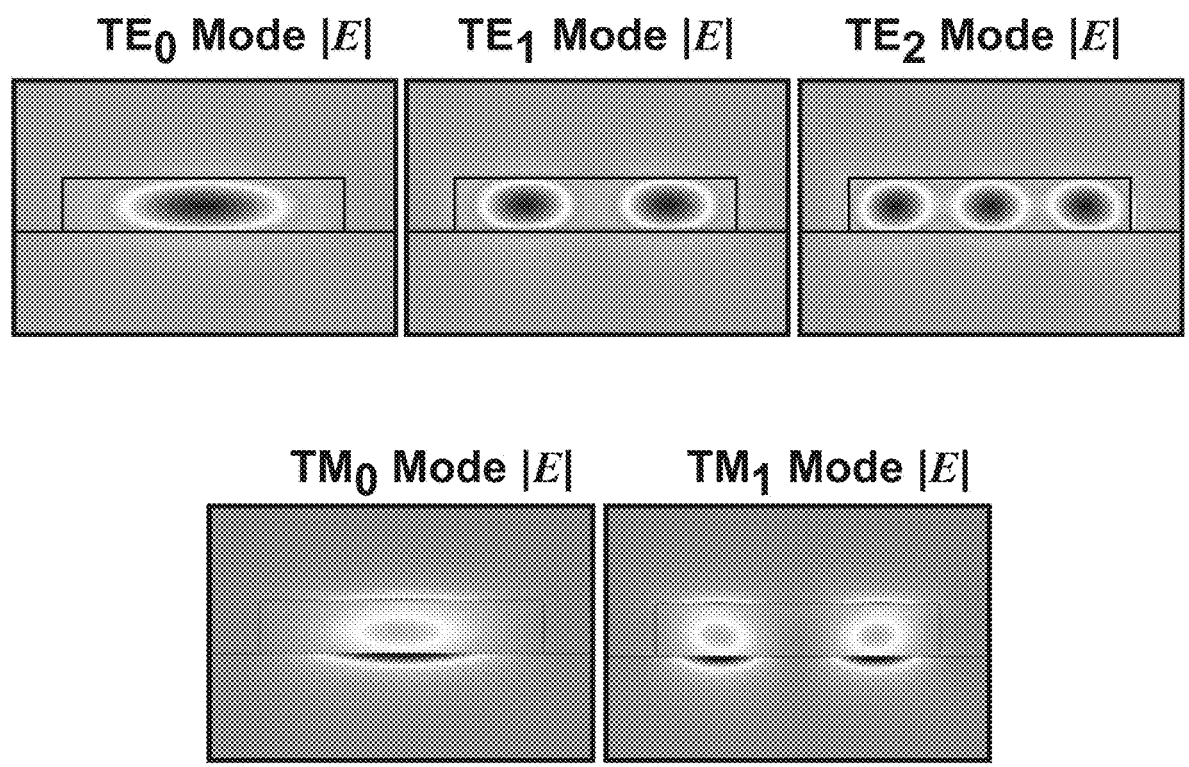
FIG. 7 illustrates the calculated optical mode shapes for various optical modes for AE Brillouin devices in accordance with one or more embodiments of the present invention.

For the InGaAsP/LiNbO$_3$ system, the calculated required acoustic wavelengths needed for intra- and inter-modal forward Brillouin scattering as a function of the modeled waveguide geometry are illustrated in FIGS. 6A-6E. As illustrated, for different combinations of TE and TM polarized optical modes, the allowable acoustic wavelengths range from 2 µm to 20 µm. This wavelength range is consistent with traditional surface acoustic wave (SAW) devices in both bulk and thin film LiNbO$_3$ material systems. Therefore, the desired acoustic modes for inter-modal forward Brillouin scattering will be traditional SAW modes with high piezoelectric coupling coefficients ($k^2$) for a strong AE interaction. The two SAW modes with the highest $k^2$ in Y-cut LiNbO$_3$ are the Rayleigh and shear horizontal (SH) modes. Additionally, these SAW modes will be guided and laterally confined by the density mismatch between the InGaAsP and the LiNbO$_3$. As a result of each SAW mode's strain profile, the Rayleigh SAW will have the strongest overlap between optical modes of the same parity, while the SH SAW will have the strongest overlap between optical modes of different polarizations. Therefore, the five optical modes considered in the subsequent designs are the TE$_0$, TE$_1$, TE$_2$, TM$_0$, and TM$_1$ modes. Example calculated mode shapes for these optical modes in the InGaAsP/LiNbO$_3$ system are illustrated in FIG. 7. Based on these calculations, exemplary optical pairs include three waveguide modes with the TE$_0$/TE$_0$ mode pair, while the exemplary optical pairs for the Rayleigh and SH acoustic modes, respectively, are the TE$_0$/TE$_2$ and TE$_0$/TM$_0$, mode pairs, respectively. These mode triplets are illustrated in FIGS. 8A-8E.

For intra-modal backward Brillouin scattering, the acoustic wave number is approximately twice as long as the optical pump wave number:

$$q_m = 2k_p(\omega_p). \quad \text{(Eq. 26)}$$

From Equation 26, the acoustic wavelength can again be solved for in terms of the optical wavelength and effective mode index and expressed as:

$$\lambda_m = \frac{\lambda_p}{2n_{eff}^p}. \quad \text{(Eq. 27)}$$

In accordance with Equation 27, the required acoustic wavelength for intra-modal backward scattering will always be smaller than half of the optical wavelength in vacuum, depending on how large the effective mode index is of the optical pump. Using the TE$_0$ optical mode, the required acoustic wavelength for intra-modal backward Brillouin scattering as a function of modeled waveguide geometry is illustrated in FIG. 6A. The acoustic wavelength is almost independent of both waveguide width and thickness, resulting in an acoustic wavelength around 300 nm. This acoustic wavelength is the same order of magnitude as the waveguide dimensions, resulting in acoustic modes that are a hybrid of traditional LiNbO$_3$ SAW modes and InGaAsP waveguide modes, which are termed acoustic waveguide modes. The result is that the strain is almost entirely confined in the InGaAsP waveguide. These acoustic waveguide modes thus have strain profiles characteristic of either the Rayleigh or SH SAW mode, which means these waveguide modes will have the same favorable propagation angle as the SAW mode it resembles most.

For intra-modal forward Brillouin scattering, phase matching requires that the acoustic wave number is approximately:

$$q_m = \frac{\Omega_m}{v_g}, \quad \text{(Eq. 26A)}$$

where $v_g$ is the optical group velocity of the pump and Stokes modes. From Equation 26A, the acoustic wavelength can again be solved for in terms of the optical group velocity and mechanical phonon frequency as:

$$\lambda_m = \frac{2\pi v_g}{\Omega_m}. \quad \text{(Eq. 27A)}$$

Typically, Equation 27A implies that the acoustic wavelength for intra-modal forward Brillouin scattering is much larger than either intra-modal backward Brillouin scattering or inter-modal forward Brillouin scattering. The acoustic wavelength for intra-modal forward Brillouin scattering would, for example, be at least approximately 40 µm.

The next stage in the design process is to simulate the piezoelectric coupling coefficient for each possible acoustic mode in order to identify which modes have a high $k^2$ for a strong AE interaction. In the presence of a perfect conductor, the piezoelectric coupling coefficient of a surface acoustic wave can be calculated by the shift in acoustic velocity as the perfect conductor is brought from infinitely far away to the surface of the piezoelectric material. Using a finite element analysis (FEA) simulation, this can be achieved through two different eigenfrequency simulations. One will have an electrically free LiNbO$_3$ surface and the other will have a grounded piezoelectric surface. The piezoelectric coupling coefficient can be calculated as:

$$k^2 = \frac{|v_{free}^2 - v_{ground}^2|}{v_{free}^2} = \frac{|f_{free}^2 - f_{ground}^2|}{f_{free}^2}, \quad \text{(Eq. 28)}$$

where $v_{free}$ is the acoustic velocity with a free piezoelectric surface and $v_{ground}$ is the acoustic velocity with a grounded piezoelectric surface. Since the acoustic wavelength is the same for both simulations, the piezoelectric coupling coefficient can be expressed in terms of the acoustic eigenfrequency for the free piezoelectric surface ($f_{free}$) and grounded piezoelectric surface ($f_{ground}$).

Figure 8E:
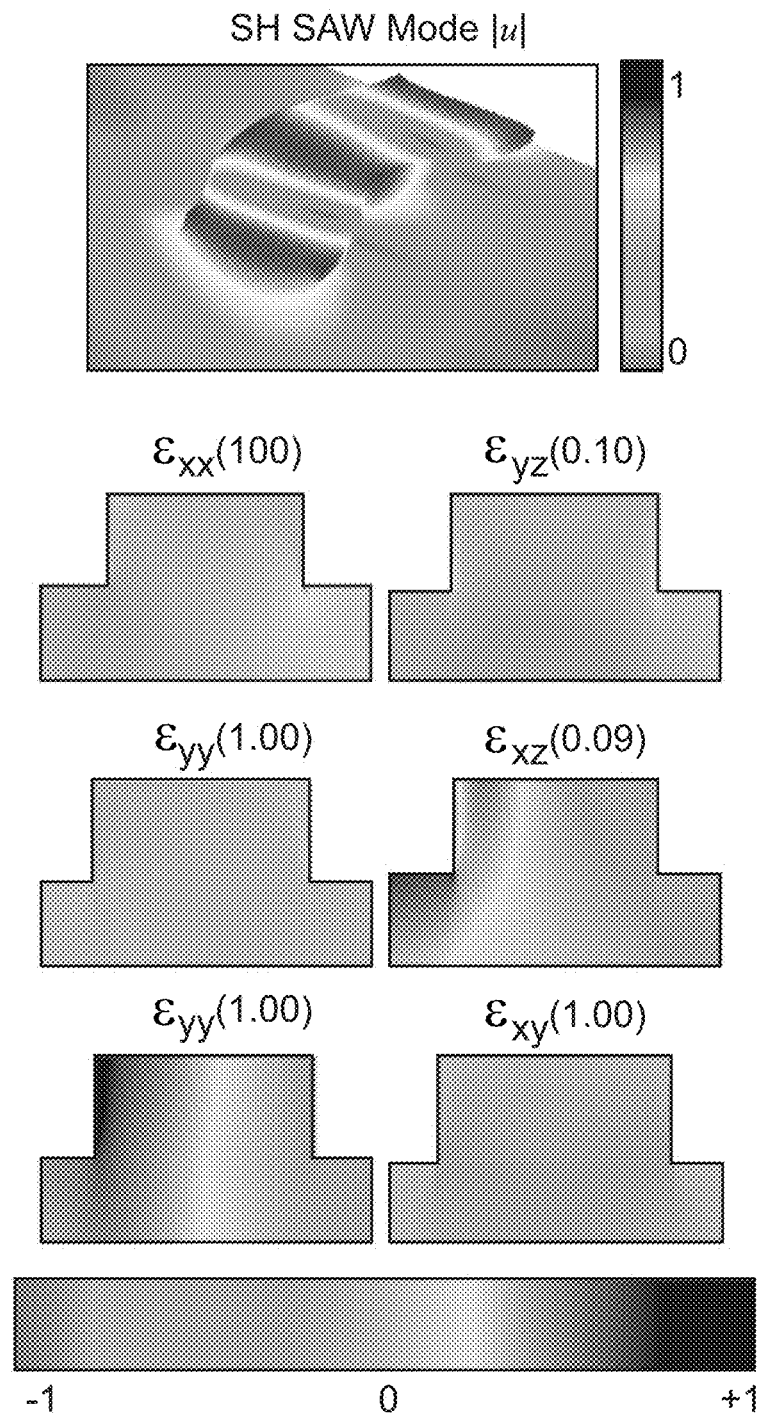

In the case of an unguided Rayleigh SAW mode in Y-cut LiNbO$_3$, the $k^2$ is highest in a 0° propagation direction with a value around 5%. Similarly, the unguided SH SAW mode has its highest $k^2$ in a 90° propagation direction with a value around 18%. The inclusion of the InGaAsP waveguide on top of the LiNbO$_3$ guides the Rayleigh and SH SAW modes within the InGaAsP, with the amount of guiding dependent on the relative size difference between the waveguide width and acoustic wavelength. The calculated acoustic mode shapes and strain profiles, for example guided Rayleigh and SH SAW modes, are illustrated in FIGS. 8D and 8E, respectively. The $k^2$ calculation is also adjusted to account for the addition of the InGaAsP waveguide. In order to consider the interaction strength between the acoustic mode and free carriers in the InGaAsP, the grounded eigenfrequency is calculated with the perfect conductor placed only at the interface between the InGaAsP waveguide and the LiNbO$_3$ surface. This means all Rayleigh and SH SAW modes used for inter-modal Brillouin scattering will only have a fraction of the $k^2$ found in unguided LiNbO$_3$ propagation. As the acoustic wavelength approaches the waveguide width, a larger fraction of the acoustic mode is guided within the waveguide, resulting in a larger $k^2$ as it approaches the unguided $k^2$ limit. Additionally, as more of the acoustic energy is guided within the InGaAsP waveguide, there is a larger overlap between the optical modes and acoustic strain profiles. Therefore, it is advantageous in the design process for inter-modal Brillouin devices to reduce the required acoustic wavelength to as close to the waveguide dimensions as possible in order to achieve higher AE and OM coupling strengths.

For backward intra-modal Brillouin scattering, some example calculated acoustic mode shapes and strain profiles for three acoustic waveguide modes are illustrated in FIGS. 8A-8C. For acoustic waveguide mode 1, the displacement is primarily at the edges of the waveguide, which has poor overlap with the TE$_0$ optical fields. Since the $\varepsilon_{zz}$ and $\varepsilon_{xz}$ strain components are similar to the SH SAW mode, the propagation angle with the highest $k^2$ is 90°. Acoustic waveguide mode 2 has displacement throughout the entire width of the waveguide and therefore a much larger overlap with the optical fields. Acoustic waveguide mode 2 and the Rayleigh SAW mode have similar strain profiles and the same dominant strain components, i.e., $\varepsilon_{yy}$ and $\varepsilon_{zz}$, which means acoustic waveguide mode 2 will have the highest $k^2$ at a 0° propagation angle. Finally, acoustic waveguide mode 3 has a mix of shear and longitudinal displacements with several nodes and anti-nodes along the width of the waveguide. As a result, there is no clear preference in propagation direction and acoustic waveguide mode 3 has similar $k^2$ values in both 0° and 90° propagation directions.

After the simulation of the optical modes, acoustic modes, and piezoelectric coupling coefficient calculation, the next step in the design process is to calculate the OM coupling coefficient, $g_0$. The two main contributions to OM coupling are from the photoelastic, $g_{pe}$, and the radiation pressure, $g_{rp}$, effects, where $g_0 = g_{pe} + g_{rp}$.

The photoelastic coupling coefficient is given as:

$$g_{pe} = |C_m||C_p||C_s|\xi \iint_A (D_p^i)^* D_s^j p^{ijkl} \varepsilon^{kl} dA, \quad \text{(Eq. 29)}$$

where $D_p$ and $D_s$ are the electric displacement fields of the pump and Stokes photons extracted from simulation, p is the fourth-rank photoelastic tensor, $\varepsilon$ is the second-rank strain tensor extracted from simulation, and $\xi$ is the frequency constant defined as:

$$\xi = \frac{1}{\epsilon_0}\sqrt{\frac{\omega_p}{2}}\sqrt{\frac{\omega_s}{2}}\sqrt{\frac{\hbar\Omega_m}{2}}. \quad \text{(Eq. 30)}$$

The tensor product is integrated over the cross-sectional area perpendicular to the wave propagation and the elastic strain and electric displacement fields need to be normalized. A normalization factor can be implemented for the phonon displacement ($|C_m|$), pump photon electric displacement field ($|C_p|$), and Stokes photon electric displacement field ($|C_s|$):

$$|C_m|^2 = \frac{1}{\Omega_m^2 \iint_A \rho(|u_x|^2 + |u_y|^2 + |u_z|^2)dA}, \quad \text{(Eq. 31A)}$$

$$|C_p|^2 = \frac{1}{\frac{1}{\epsilon_0}\iint_A \frac{1}{\epsilon_r}(|D_x^p|^2 + |D_y^p|^2 + |D_z^p|^2)dA}, \text{ and} \quad \text{(Eq. 31B)}$$

$$|C_s|^2 = \frac{1}{\frac{1}{\epsilon_0}\iint_A \frac{1}{\epsilon_r}(|D_x^s|^2 + |D_y^s|^2 + |D_z^s|^2)dA}, \quad \text{(Eq. 31C)}$$

where u is the elastic displacement field, $\epsilon_r$ is the relative permittivity, and $D^{p,s}$ is the electric displacement field (pump or Stokes). Since the elastic strain is the symmetric gradient of the displacement, the $|C_m|$ normalization factor is used for the strain tensor in Eq. 29. To compute this coupling coefficient, the simulation data is extracted and converted into matrices. The tensor product within the integration is then computed through matrix multiplication and integrated.

A compacted Voigt notation is used to reduce the second and fourth-rank tensors so that matrix multiplication can be used within the integration. The compacted notation is 1=(xx), 2=(yy), 3=(zz), 4=(yz)=(zy), 5=(xz)=(zx), 6=(xy)=(yx). This reduces the photoelastic coupling coefficient to:

$$g_{pe} = |C_m||C_p||C_s|\xi \iint_A [D][p][\varepsilon]dA, \quad \text{(Eq. 32)}$$

where the electric displacement field product ([D]) is a [1×6] matrix, the photoelastic constants ([p]) are a [6×6] matrix, and the strain ([$\varepsilon$]) is a [6×1] matrix. InGaAsP has a cubic crystal structure with 3 independent photoelastic constants and the coupling matrix takes the form:

$$[p] = \begin{bmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{44} & 0 & 0 \\ 0 & 0 & 0 & 0 & p_{44} & 0 \\ 0 & 0 & 0 & 0 & 0 & p_{44} \end{bmatrix}. \quad \text{(Eq. 33)}$$

The strain matrix is given as:

$$[\varepsilon] = \begin{bmatrix} \varepsilon_{xx} \\ \varepsilon_{yy} \\ \varepsilon_{zz} \\ 2\varepsilon_{yz} \\ 2\varepsilon_{xz} \\ 2\varepsilon_{xy} \end{bmatrix}, \quad \text{(Eq. 34)}$$

and the electric displacement field product is given as:

$$[D] = \left[ \{(D_x^p)^* D_x^s\} \{(D_y^p)^* D_y^s\} \{(D_z^p)^* D_z^s\} 2\{(D_x^p)^* D_z^s\} 2\{(D_x^p)^* D_y^s\} \right]. \quad \text{(Eq. 35)}$$

To include the contribution of LiNbO$_3$ in the photoelastic coupling coefficient, the treatment above is modified to use the photoelastic coupling matrix of a trigonal crystal structure when integrating over regions of LiNbO$_3$:

$$[p] = \begin{bmatrix} p_{11} & p_{12} & p_{13} & p_{14} & 0 & 0 \\ p_{12} & p_{11} & p_{13} & -p_{14} & 0 & 0 \\ p_{31} & p_{31} & p_{33} & 0 & 0 & 0 \\ p_{41} & -p_{41} & 0 & p_{44} & 0 & 0 \\ 0 & 0 & 0 & 0 & p_{44} & p_{41} \\ 0 & 0 & 0 & 0 & p_{14} & \frac{1}{2}(p_{11}-p_{12}) \end{bmatrix} \quad \text{(Eq. 36)}$$

Equation 36 includes eight independent photoelastic constants ($p_{11}$, $p_{33}$, $p_{44}$, $p_{12}$, $p_{13}$, $p_{31}$, $p_{14}$, $p_{41}$) and these values can be found in A. S. Andrushchak et al., "Complete sets of elastic constants and photoelastic coefficients of pure and MgO-doped lithium niobate crystals at room temperature," Journal of Applied Physics, vol. 106, art. no. 073510 (2009), the contents of which are incorporated herein by reference. Since the optical modes are guided within the InGaAsP, there is little overlap between the elastic mode and optical fields in the LiNbO$_3$, which means the contribution to the overall photoelastic coupling is very small.

The radiation pressure coupling coefficient (in units of (rad/s)$\sqrt{m}$) is given as:

$$g_{rp} = |C_m||C_p||C_s|\xi \int\int_A \epsilon_0 [(E_p^{\|*} \cdot E_s^\|)\nabla\epsilon - (D_p^{\perp*} \cdot D_s^\perp)\nabla\epsilon^{-1}] \cdot u \, dA, \quad \text{(Eq. 37)}$$

where $E_{p,s}^\|$ is the component of the electric field parallel to the defined normal and $D_{p,s}^\perp$ is the component of the electric displacement field perpendicular to the defined normal. Since the physical system only has discrete permittivities, there exists permittivity discontinuities at the material interfaces. Since the gradient of the permittivity is zero within the materials, this integral collapses to a line integral around the boundaries of the waveguide. At the waveguide boundaries, the permittivity is a step function between the permittivity of the waveguide ($\epsilon_1$) and the surrounding material ($\epsilon_2$). Since the gradient of a unit step function is a delta function, the radiation pressure coupling coefficient can be written as:

$$g_{rp} = |C_m||C_p||C_s|\xi \int_L \epsilon_0 [(E_p^{\|*} \cdot E_s^\|)\nabla\epsilon - (D_p^{\perp*} \cdot D_s^\perp)\nabla\epsilon^{-1}]\hat{n} \cdot u \, dL, \quad \text{(Eq. 38)}$$

where $\Delta\epsilon=\epsilon_1-\epsilon_2$, $\Delta\epsilon^{-1}=\epsilon_1^{-1}-\epsilon_2^{-1}$, and $\hat{n}$ is the normal of the line integral path.

Figure 9A:
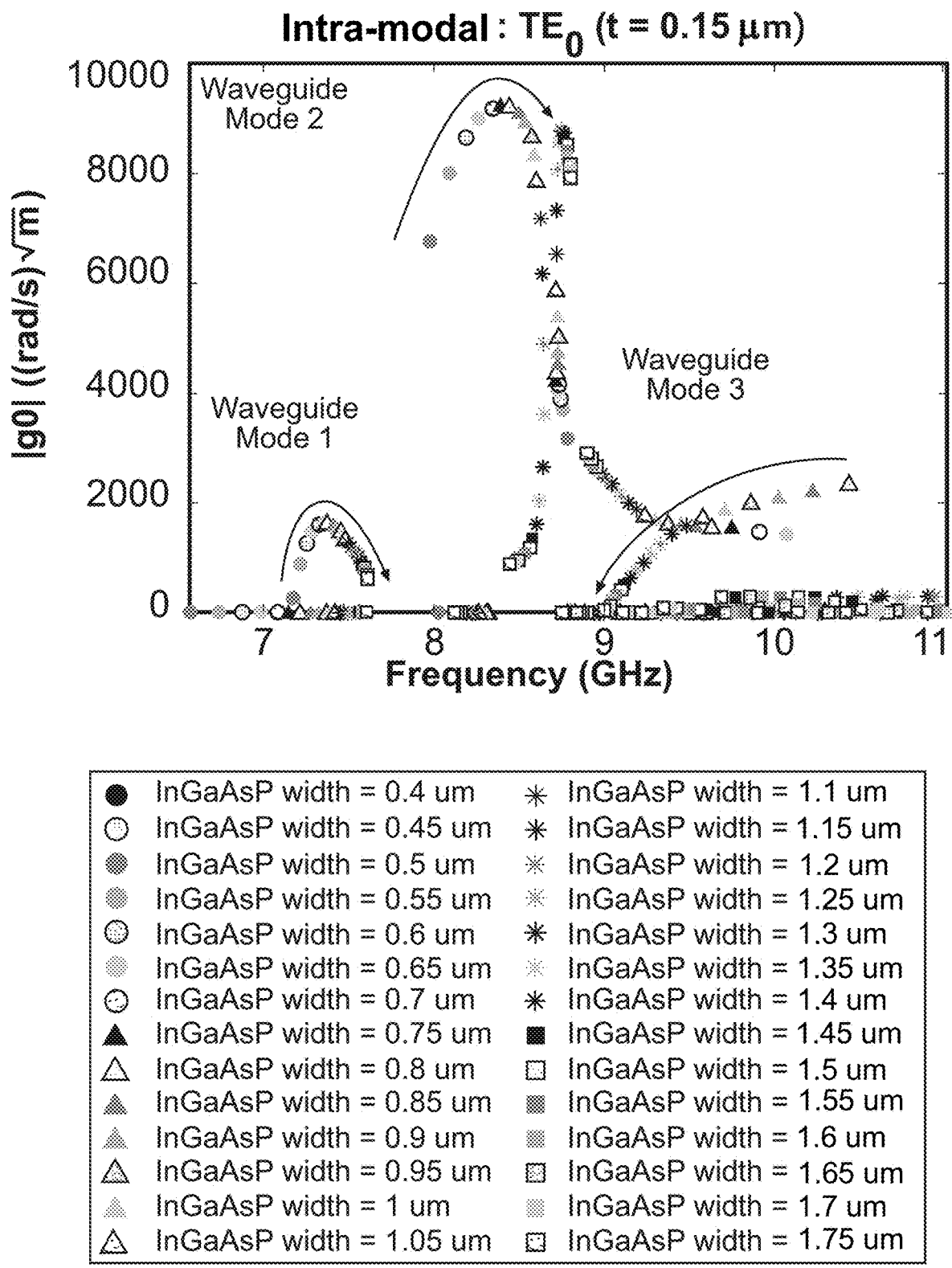
FIGS. 9A-9E illustrate the calculated optomechanical coupling for simulated elastic modes in AE Brillouin devices in accordance with one or more embodiments of the present invention.
Figure 9B:
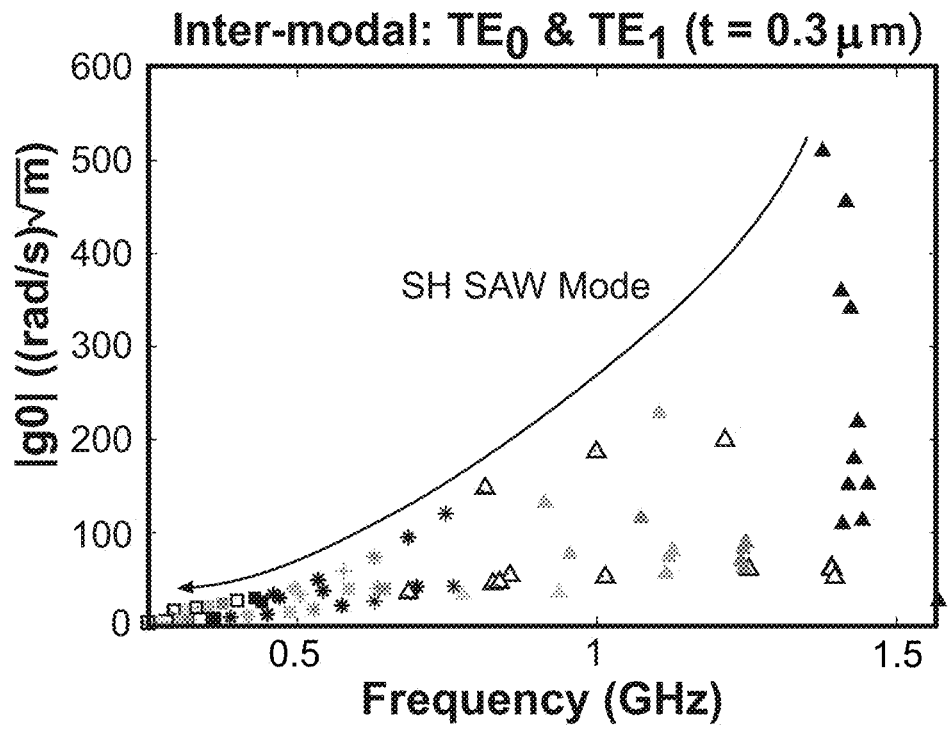
Figure 9C:
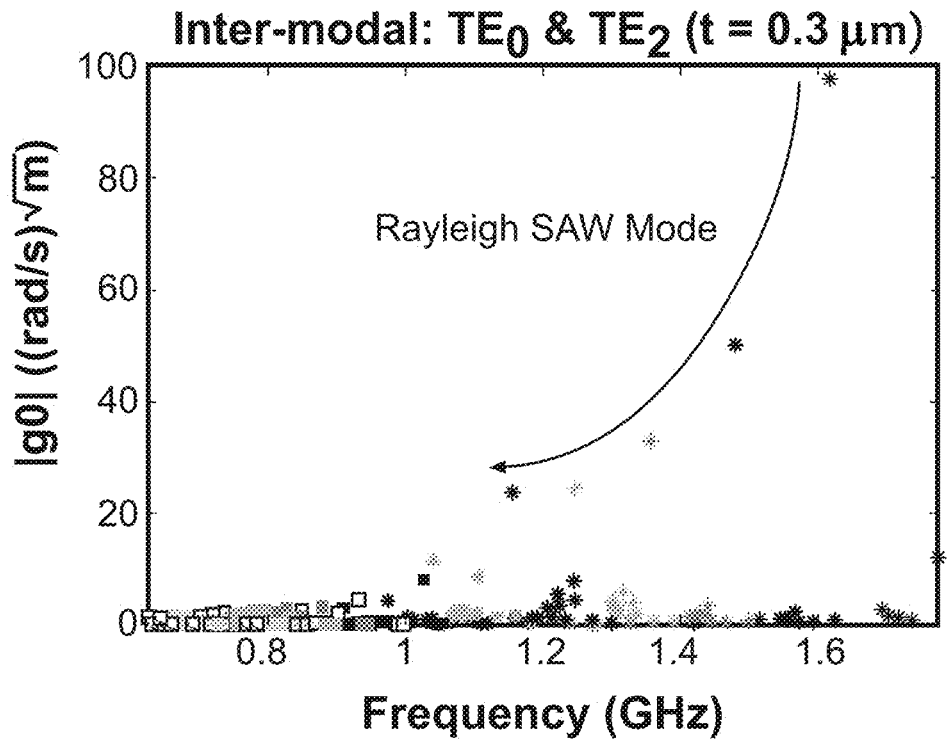
Figure 9D:
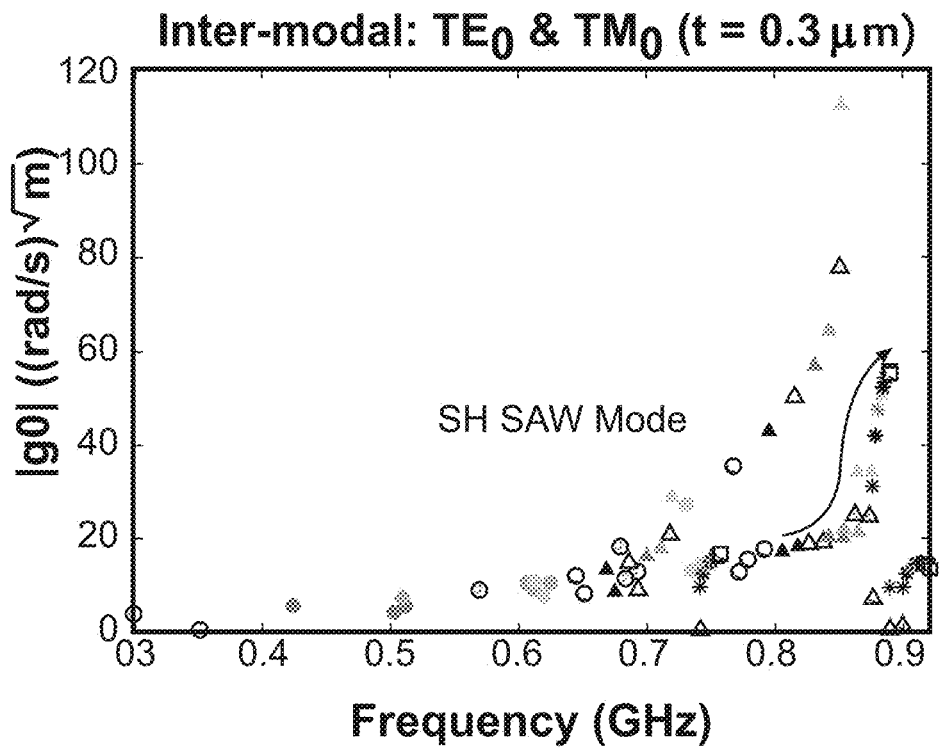
Figure 9E:
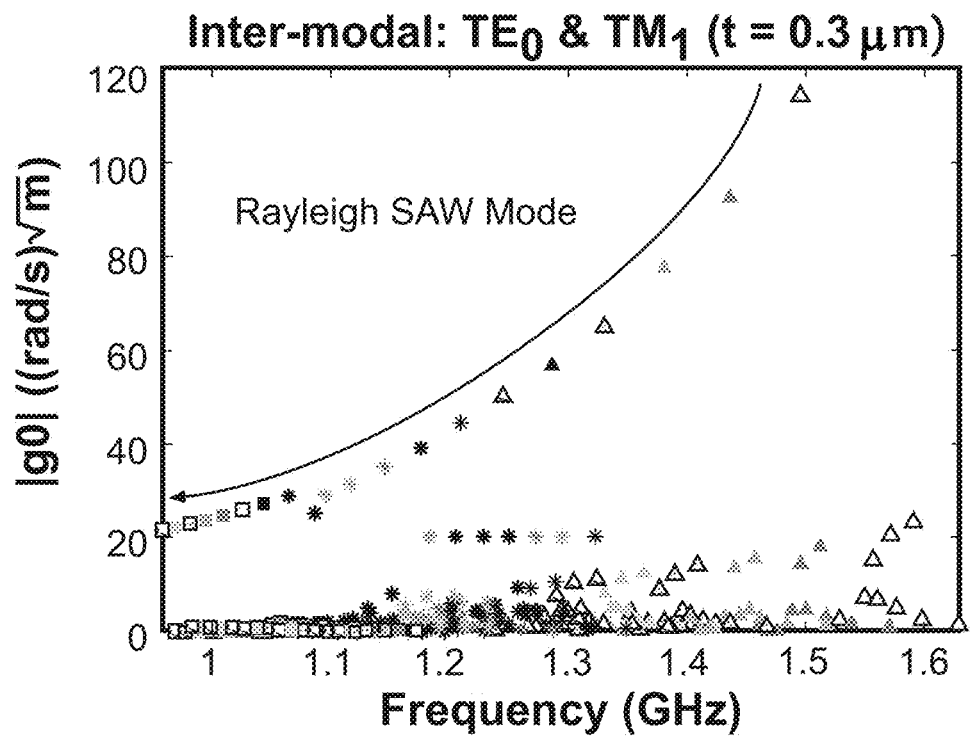

The OM coupling for key simulated elastic modes is plotted in FIGS. 9A-9E at a fixed waveguide thickness as the waveguide width is swept from 0.4 μm to 1.75 μm (black arrows). For the case of backward intra-modal Brillouin scattering, the OM coupling trends for three elastic waveguide modes are shown in FIG. 9A. Both waveguide modes 1 and 2 have an optimal waveguide width which maximizes the OM coupling coefficient. This is a result of two competing trends found in this physical system. Since the elastic modes have a slower phase velocity in InGaAsP compared to LiNbO$_3$, a larger fraction of the strain is guided within the InGaAsP as the waveguide width is increased, increasing the overlap with the optical fields. On the other hand, increasing the waveguide width reduces the magnitude of the optical fields at the boundaries of the InGaAsP waveguide, reducing the overlap with the strain. When directly comparing the first two waveguide modes, waveguide mode 2 will have a larger OM coupling coefficient compared to waveguide mode 1, which is a result of the different strain profiles between the two elastic modes. Waveguide mode 1 has a majority of its strain around the edges of the InGaAsP waveguide, which has a lower overlap with the optical fields. For waveguide mode 3, there is only a reduction in OM coupling as the waveguide width is increased. Since waveguide mode 3 has several displacement nodes along the waveguide width, there exists a minimum waveguide width where this mode is allowed. Overall, waveguide mode 2 has the highest OM coupling.

For the cases of forward inter-modal Brillouin scattering shown in FIGS. 9B-9E, the trends in OM coupling as a function of waveguide width are influenced by additional factors. For each simulated optical mode, a different set of waveguide cutoff dimensions exists, creating different cutoff waveguide widths for each optical mode pair. In addition, the phase-matched phonon wavelength varies as a function of waveguide width, which will change the confinement of the elastic mode and overlap with the optical fields. For the optical mode pairs shown in FIGS. 9B, 9C, and 9E, the dominant factor in the OM coupling trends for the Rayleigh and SH SAW modes is the change in phase-matched phonon wavelength. As the waveguide width is increased, the phase-matched phonon wavelength also increases, reducing the confinement and overlap with the optical fields. In the case of the TE$_0$ and TM$_0$ optical mode pair illustrated in FIG. 9D, the phase-matched phonon wavelength does not change significantly with waveguide width and the trend in OM coupling is similar to those found in backward intra-modal Brillouin scattering.

The following analysis for the AE gain portion of the design process is based on the Normal Mode Theory as described by Kino and Reeder. See G. S. Kino and T. M. Reeder, "A Normal Mode Theory for the Rayleigh Wave Amplifier," IEEE Transactions on Electron Devices, vol. ED-18, no. 10, pp. 909-920 (1971), the contents of which are incorporated herein by reference. In the presence of a semiconductor with a finite film thickness, the acoustic wave's propagation constant can be expressed as:

$$q = q_m + q_{AE} - \frac{i\alpha_{AE}}{2}, \quad \text{(Eq. 39)}$$

where $q_m$ is the acoustic wave's propagation constant with no semiconductor, $\alpha_{AE}$ is the AE gain, and $q_{AE}$ is the AE phase delay. The AE contributions to the gain and phase delay are given as:

$$\alpha_{AE} = \frac{\left(\frac{v_d}{v_m} - 1\right)\omega_c \epsilon_s Z'_m(q_m h)q_m \tanh(q_m d)}{\left(\frac{v_d}{v_m} - 1\right)^2 + \left(\frac{R\omega_c}{\Omega_m} + D\right)^2} \text{ and} \quad \text{(Eq. 40A)}$$

$$q_{AE} = \frac{1}{2}\frac{\left(\frac{R\omega_c}{\Omega_m} + D\right)\omega_c \epsilon_s Z'_m(q_m h)q_m \tanh(q_m d)}{\left(\frac{v_d}{v_m} - 1\right)^2 + \left(\frac{R\omega_c}{\Omega_m} + D\right)^2}, \quad \text{(Eq. 40B)}$$

where $\Omega_m$ is the acoustic frequency, h is the gap height between the LiNbO$_3$ and InGaAsP waveguide, d is the InGaAsP waveguide thickness, $\epsilon_s$ is the InGaAsP permittivity, $v_m$ is the acoustic wave phase velocity, $v_s$ is the free carrier drift velocity, and D is the diffusion term.

The dielectric relaxation frequency and diffusion frequency can be expressed as:

$$\omega_c = \frac{q\mu N}{\epsilon_s} \text{ and} \quad \text{(Eq. 41A)}$$

$$\omega_D = \frac{v_b^2 q}{\mu k_B T}, \quad \text{(Eq. 41B)}$$

where q is the elementary charge, μ is the free carrier mobility, N is the free carrier concentration, $k_B$ is the Boltzmann constant, and T is the temperature.

The space charge potential factor (M) above the piezoelectric surface is given as:

$$M(q_m h) = \frac{\epsilon_g + \epsilon_p \tanh(q_m h)}{(\epsilon_g + \epsilon_p)(1 + \tanh(q_m h))}, \quad \text{(Eq. 42)}$$

where $\epsilon_p$ and $\epsilon_g$ are the permittivities of the $LiNbO_3$ piezoelectric and InP gap dielectric, respectively.

The interaction impedance ($Z_m$) of the acoustic wave above the piezoelectric surface is a measure of the overlap between the potential and free carriers and is given as:

$$Z_m(q_m h) = Z_m(0) e^{-2q_m h}. \quad \text{(Eq. 43)}$$

The strength of the interaction impedance decays exponentially as the height of the dielectric gap is increased, with a maximum occurring at the piezoelectric surface, i.e.:

$$Z_m(0) = \frac{k^2}{\Omega_m (\epsilon_g + \epsilon_p)}, \quad \text{(Eq. 44)}$$

where $k^2$ is the piezoelectric coupling coefficient of the acoustic mode.

The introduction of the dielectric above the semiconductor thin film will perturb the fields because of the top dielectric permittivity ($\epsilon_d$). The perturbed values for the space charge potential factor and interaction impedance are given as:

$$M'(q_m h) = \frac{M(q_m h)}{1 + \left(\frac{\epsilon_d}{\epsilon_g} - 1\right) M(q_m h)} \text{ and} \quad \text{(Eq. 45)}$$

$$Z'(q_m h) = \frac{Z_m(q_m h)}{\left[1 + \left(\frac{\epsilon_d}{\epsilon_g} - 1\right) M(q_m h)\right]^2}. \quad \text{(Eq. 46)}$$

Considering semiconductor films of a finite thickness, the space-charge reduction factor can be expressed as:

$$R = \left(\frac{\epsilon_s}{\epsilon_g}\right) M'(q_m h) \tanh(q_m d). \quad \text{(Eq. 47)}$$

The diffusion term D, which comes from carrier diffusion in the semiconductor, can be expressed as:

$$D = \sqrt{\frac{\omega_c}{\omega_D}} \frac{\tanh(q_m d)}{\tanh(\gamma d)}, \quad \text{(Eq. 48)}$$

where γ is related to the Debye length ($\lambda_d$) in the semiconductor per:

$$\gamma \cong \frac{\sqrt{\omega_c \omega_D}}{v_m} = \frac{1}{\lambda_d}. \quad \text{(Eq. 49)}$$

The conversion of this gain coefficient of the acoustic wave's amplitude to power (dB/cm) is given as:

$$\alpha_{AE}[\text{dB/cm}] = \frac{1 \text{ m}}{100 \text{ cm}} \left(\frac{20}{\ln(10)}\right) \alpha_{AE}[1/\text{m}]. \quad \text{(Eq. 50)}$$

For both inter-modal forward and intra-modal backward Brillouin devices, an iterative design process may be implemented using the previously described metrics. First, the waveguide geometry is set and simulated to determine the optical modes. This dictates the required acoustic wavelength for the Brillouin device. The acoustic modes are then simulated with free and grounded boundary conditions at the InGaAsP and $LiNbO_3$ interface. Using the difference in acoustic eigenfrequencies, the piezoelectric coupling coefficient is calculated. Finally, the OM coupling coefficient is calculated using the optical and acoustic field profiles. This design process is repeated for different waveguide geometries until a set of modes are identified with both high piezoelectric and OM coupling coefficients.

Table 1 provides example sets of modes for both intra-modal and inter-modal Brillouin devices in the InGaAsP on $LiNbO_3$ on Si system. The first three mode sets in Table 1 provide calculated results for intra-modal backward Brillouin devices using the first three waveguide acoustic modes. The OM coupling ranges between 1600-7300 rad/s $\sqrt{m}$, which depends significantly on the InGaAsP waveguide thickness. By increasing the waveguide thickness from 100 nm to 150 nm for waveguide mode 1, the OM coupling increases from 1590 to 2120 rad/s $\sqrt{m}$ while the piezoelectric coupling decreases from 4.22% to 1.29%. This trade-off in coupling requires careful consideration when choosing the applications for these intra-modal Brillouin devices. As shown in Table 1, the acoustic wavelength is preferably in the range of 0.3 μm and 0.4 μm.

The last three mode sets show the calculated performance possible in this system using the Rayleigh, SH SAW, and SH Rayleigh modes for inter-modal Brillouin devices, respectively. While the piezoelectric coupling coefficients are as high 8.84%, the photoelastic coupling is up to two orders of magnitude smaller than the acoustic waveguide modes. This reduction in the OM coupling is due to the poor confinement of the strain inside the InGaAsP waveguide. The OM coupling for inter-modal Brillouin devices could be improved if the InGaAsP waveguide was optically transparent at lower optical wavelengths. If the optical wavelength was reduced to 700 nm or even 400 nm, the coupling would increase due to two factors. First, the photoelastic scaling factor ξ would increase due to the increase in both the pump and Stokes optical frequencies. Second, it would allow for acoustic wavelengths under 2 μm, which would further increase the guiding and confinement of the strain within the InGaAsP waveguide. This will create more of an overlap with the optical fields and increase the coupling coefficient. Thus, an acoustic wavelength is preferably in the range of 1.5 μm and 4.0 μm.

TABLE 1

Calculated Performance Summary

| Optical Pair | Acoustic Mode | β | t (μm) | w (μm) | $\lambda_m$ (μm) | $F_m$ (GHz) | $v_m$ (m/s) | $|g_O|$ (rad/s $\sqrt{m}$) | $k^2$ (%) | $\alpha_{AE}$ (dB/cm) |
|---|---|---|---|---|---|---|---|---|---|---|
| $TE_0$/ $TE_0$ | WG 1 | 90° | 0.1 | 0.95 | 0.35 | 7.90 | 2740 | 1350 | 4.22 | 2090 |
| $TE_0$/ $TE_0$ | WG 2 | 0° | 0.1 | 1.1 | 0.35 | 8.78 | 3070 | 7940 | 5.87 | 3730 |
| $TE_0$/ $TE_0$ | WG 3 | 0° | 0.15 | 0.8 | 0.33 | 10.5 | 3400 | 2350 | 0.82 | 520 |
| $TE_0$/ $TE_2$ | Rayleigh | 0° | 0.3 | 1.1 | 2.10 | 1.62 | 3400 | 97.7 | 4.91 | 630 |
| $TE_0$/ $TM_0$ | SH SAW | 90° | 0.2 | 1.75 | 3.45 | 1.24 | 4290 | 50.9 | 8.84 | 1170 |
| $TE_0$/ $TE_1$ | SH Rayleigh | 0° | 0.3 | 0.7 | 2.31 | 1.42 | 3280 | 1420 | 1.43 | 170 |

Thermal Considerations

Acoustoelectric devices for RF signal processing applications have historically had difficulty operating continuously with large gain, primarily due to effects related to thermal dissipation of the current required to drive the AE current. Joule heating arises in AE devices when a voltage is applied to the semiconductor. If the thermal conductivity out of the device is not sufficient, this resistive heating can cause variations in the device response as temperature increases, and ultimately can lead to thermal runaway and even irreversible damage. This thermal behavior depends on the semiconductor resistance and geometry, the bias field required to achieve the necessary acoustic gain, and the material thermal properties of the semiconductor and all the other layers, including the substrate. However, in contrast to RF acoustic wave amplifiers that have been previously experimentally demonstrated, AE Brillouin devices have different metrics and geometries that make continuous operation significantly less challenging.

An acoustic wave amplifier for RF signal processing applications must have significant levels of terminal gain, meaning that the acoustic gain must be large enough to overcome all acoustic losses and then provide a significant level of additional acoustic gain. This is accomplished by increasing the applied drift field, which leads to larger dissipated power and concomitant heating. Ultimately, the ability to operate continuously and to reach peak AE gain is limited by thermal dissipation under these conditions. However, with respect to the AE Brillouin devices in accordance with various embodiments, improving the performance only requires that the applied drift field provides enough acoustic gain to overcome the losses inherent to the AE effect and the intrinsic phonon losses. This requires substantially less gain—and thus substantially less heat—than achieving net terminal gain in RF acoustic amplifier systems.

To illustrate the feasibility of continuous operation, the following analyzes the heat generated and temperature increase for an example device in accordance with one or more embodiments, using the $LiNbO_3$ on Si substrate with a semiconductor layer of $In_{0.71}Ga_{0.29}As_{0.63}P_{0.37}$ material platform described above. This analysis assumes an interaction length of 1 cm, a semiconductor width, w, of 0.5-1.5 μm, a semiconductor thickness, t, of 100-300 nm, an electromechanical coupling coefficient, $k^2$, of 1-9%, and an acoustic wavelength of approximately 350 nm (corresponding to a phonon frequency of $\Omega_m/2\pi$=7-11 GHZ). A phononic quality factor of 250 corresponds to a phonon propagation loss of 0.11 dB/Λ, where Λ is the acoustic wavelength. Under these conditions, it is necessary to achieve an acoustic gain of 0.11 dB/Λ or higher, which corresponds to 3100 dB/cm. The bulk semiconductor mobility for $In_{0.71}Ga_{0.29}As_{0.63}P_{0.37}$ is approximately 5000 $cm^2$/V·s. Based on L. Hackett et al., "Towards single-chip radiofrequency signal processing via acoustoelectric electron-phonon interactions," the expected as-processed thin film mobility in these type of AE Brillouin devices is reduced to approximately 2000 $cm^2$/V·s and the expected carrier concentration is $1\times10^{16}$ $cm^{-3}$. This carrier concentration and mobility lead to a conductivity-thickness product, of, that is 32-96 μS, which is one of the key factors that determine the strength of the external electric field required to reach a given level of gain as well as the amount of Joule heating that the electric field induces to achieve the requisite gain.

Figure 10:
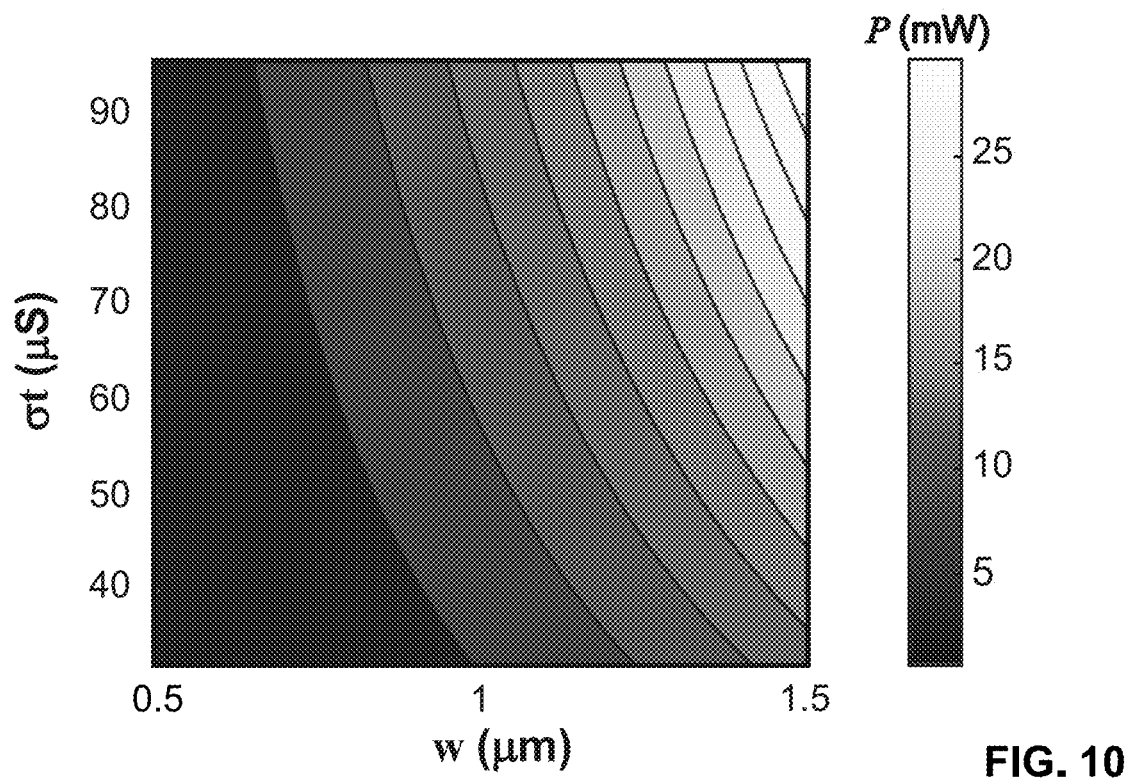
FIG. 10 illustrates the calculated results for dissipated power required to achieve an acoustic gain of 3100 dB/cm as a function of σt and w for AE Brillouin devices in accordance with one or more embodiments of the present invention.
Figure 11:
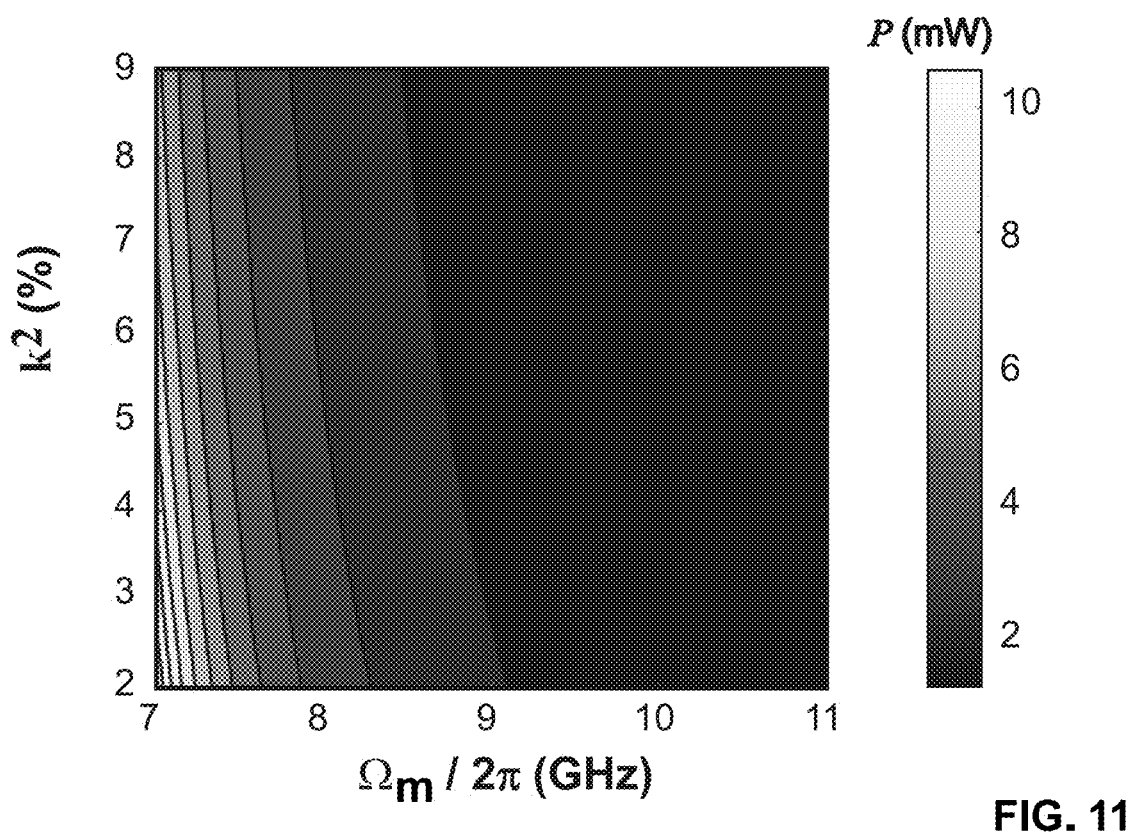
FIG. 11 illustrates the calculated results for dissipated power as a function of $k^2$ and $\Omega/2\pi$ for AE Brillouin devices in accordance with one or more embodiments of the present invention.

From these values, the dissipated power can be estimated. FIG. 10 illustrates the dissipated power required to achieve an acoustic gain of 3100 dB/cm as a function of σt and w for ($\Omega_m/2\pi$=8.78 GHz and $k^2$=5.87%. FIG. 11 shows the dissipated power as a function of $k^2$ and $\Omega_m/2\pi$ for a semiconductor width of 1.1 μm and σt=32 μS. The dissipated power varies depending on the device configuration, but can be 1 mW or less, which is significantly less than previous work where large terminal gain was achieved. See, L. Hackett et al., "Towards single-chip radiofrequency signal processing via acoustoelectric electron-phonon interactions." Low dissipated DC powers are achieved due to two factors. One factor is the device geometry and semiconductor material parameters have been optimized to make the device highly resistive. The second factor is that $\Omega_m$ and $k^2$ are both larger, resulting in larger acoustic gain being produced with smaller bias fields.

Another aspect that should contribute to the feasibility of continuous operation in AE Brillouin devices is that the interactions take place in a waveguide with a small cross-sectional width, approximately 0.5-1.5 μm. This makes the device more resistive and enables more efficient lateral heat transport by increasing the surface to volume ratio compared to wider devices.

Beyond reducing the power dissipated, the temperature increase is also decreased by using a piezoelectric compound substrate that consists of a $LiNbO_3$ film on a bulk Si substrate as opposed to a bulk $LiNbO_3$ substrate, both of which were demonstrated in L. Hackett et al., "Towards single-chip radiofrequency signal processing via acoustoelectric electron-phonon interactions." The thermal conductivity of $LiNbO_3$ is 4.6 W/m·K while the thermal conductivity of Si is 150 W/m·K. Therefore, the 30× increase of thermal conductivity of Si over LiNbO$_3$ leads to a significantly smaller temperature rise for a given dissipated power. As noted above, only net phonon gain, as opposed to terminal gain (which must overcome all acoustic, electronic, and transducer losses), is necessary to enhance Brillouin OM interactions via the AE effect—a much less stringent requirement.

Figure 12:
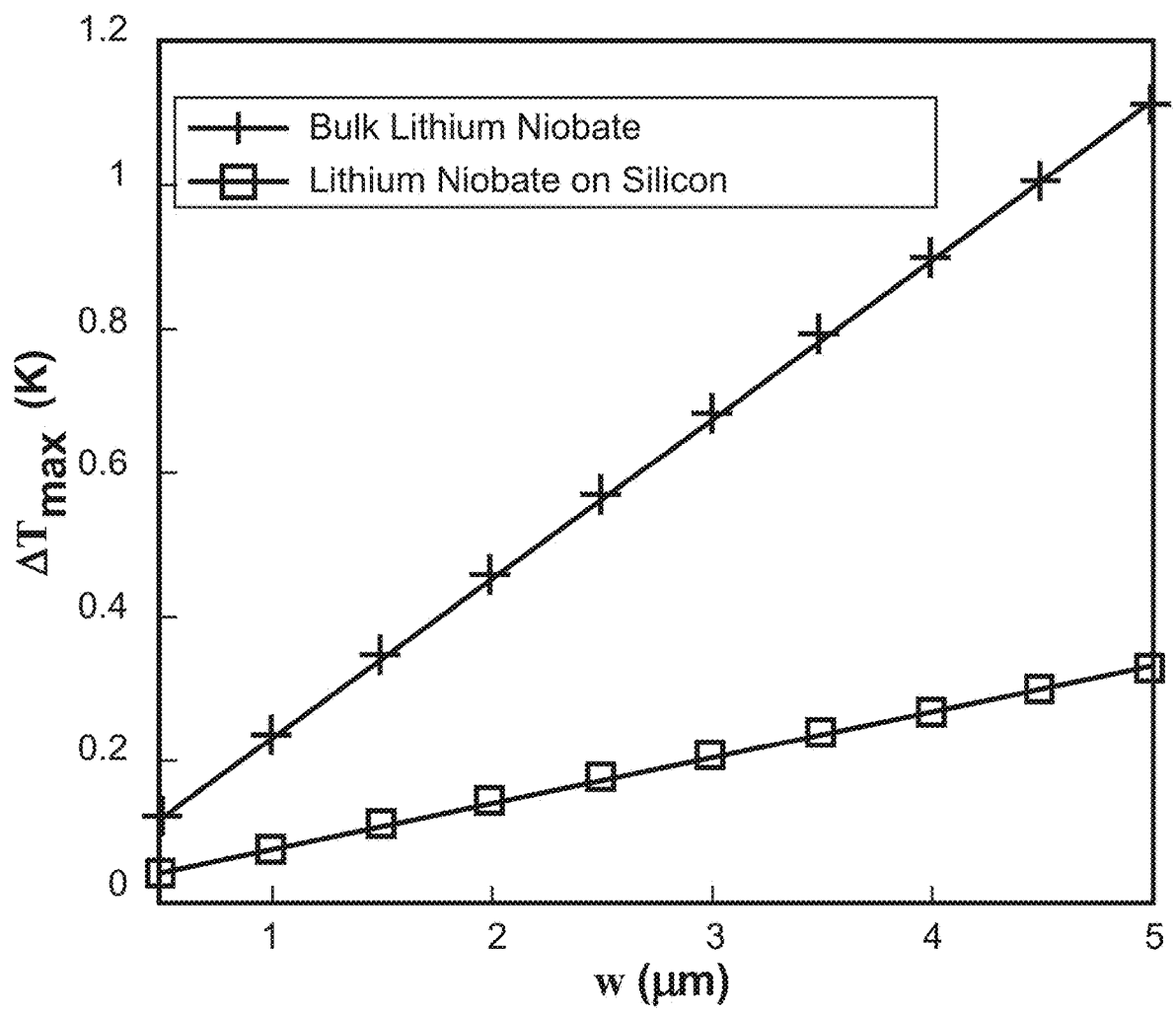
FIG. 12 illustrates the calculated results of the maximum temperature difference as a function of width, w, for AE Brillouin devices in accordance with one or more embodiments of the present invention.

A finite element method model was used to model conductive and convective heat transfer for this exemplary device operating in air at ambient temperature. The modeled device has a 100 nm thick, 1.1 µm wide, and 1 cm long In$_{0.71}$Ga$_{0.29}$As$_{0.63}$P$_{0.37}$ semiconductor film on a thin film LiNbO$_3$ (5 µm thick) on Si substrate or a bulk LiNbO$_3$ substrate. The In$_{0.71}$Ga$_{0.29}$As$_{0.63}$P$_{0.37}$ density is 5204 kg/cm$^3$, the heat capacity at constant pressure is 335 J/kg K, the thermal conductivity is 4.35 W/m·K, and the coefficient of thermal expansion is 5.26×10$^{-6}$ 1/K. FIG. 12 shows the maximum temperature difference $\Delta T_{max}$, defined as the difference between the maximum steady-state temperature and the ambient temperature, as a function of w for the case of a bulk LiNbO$_3$ substrate and a LiNbO$_3$ film on a Si substrate. For a semiconductor width of 1.1 µm on the thin film LiNbO$_3$ on Si substrate, $\Delta T_{max}$=0.08 K, which is approximately 200× smaller than the temperature rise associated with achieving terminal gain in L. Hackett et al., "Towards single-chip radiofrequency signal processing via acoustoelectric electron-phonon interactions," where the maximum gain applied was limited by the need to avoid significant temperature increases. In conventional AE devices, predicting device behavior is complicated by Joule heating. For example, heating leads to a temperature-dependent semiconductor conductivity which modifies the acoustic gain. The modeling results suggest that these thermal effects do not need to be considered for AE Brillouin devices, at least in the modeled parameter space, as the dissipated DC power is relatively small and thermal dissipation is effective.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An acoustoelectric (AE) Brillouin device comprising:
   a substrate including a layer adapted to support AE coupling;
   a waveguide on the layer adapted to support AE coupling, the waveguide adapted to transmit an optical signal and an optical pump, the waveguide including semiconductor material, the semiconductor material including free carriers, wherein at least one of the layer adapted to support AE coupling or the semiconductor material is adapted to provide AE gain; and
   first and second contacts, the first and second contacts in electrical contact with corresponding opposite ends of a portion of the semiconductor material thereby defining an interaction region, the first and second contacts adapted to apply a drift field across the interaction region;
   wherein a combination of the layer adapted to support AE coupling and the interaction region are adapted to simultaneously support both optical and acoustic modes, to enable a strong overlap of optical and acoustic modes, to enable significant optomechanical coupling, and to enable significant AE gain.

2. The AE Brillouin device of claim 1, wherein $$\frac{\Gamma}{\Gamma - G_{AE}} \geq 0.5,$$

where $G_{AE}$ is the AE phonon gain rate (in sec$^{-1}$) and $\Gamma$ is the intrinsic phonon loss rate (in sec$^{-1}$).

3. The AE Brillouin device of claim 1, wherein $G_B$PL≥0.1, where $G_B$ is a Brillouin gain coefficient (in watts$^{-1}$ meters$^{-1}$), P is a pump power (in watts), and L is a length of the interaction region (in meters).

4. The AE Brillouin device of claim 3, wherein the AE Brillouin device employs an optically resonant configuration with an effective propagation length of L=L$_{eff}$ (in meters), such that $G_B$PL$_{eff}$≥0.1.

5. The AE Brillouin device of claim 1, wherein $$G_B PL \times \frac{\Gamma}{\Gamma - G_{AE}} \geq 0.2,$$

where $G_B$ is a Brillouin gain coefficient (in watts$^{-1}$ meters$^{-1}$), P is a pump power (in watts), L is a length of the interaction region (in meters), $G_{AE}$ is the AE phonon gain rate (in sec$^{-1}$), and $\Gamma$ is the intrinsic phonon loss rate (in sec$^{-1}$).

6. The AE Brillouin device of claim 5, wherein the AE Brillouin device employs an optically resonant configuration with an effective propagation length of L=L$_{eff}$, such that $$G_B PL_{eff} \times \frac{\Gamma}{\Gamma - G_{AE}} \geq 0.2.$$

7. The AE Brillouin device of claim 1, wherein the AE Brillouin device is adapted to be operated in one of:
   an inter-modal forward stimulated Brillouin scattering mode, for which an acoustic wavelength within the semiconductor material is between approximately 1.0 µm and approximately 100 µm;
   an intra-modal backward stimulated Brillouin scattering mode, for which an acoustic wavelength within the semiconductor material is between approximately 0.1 µm and approximately 4.0 µm; or
   an intra-modal forward stimulated Brillouin scattering mode, for which an acoustic wavelength within the semiconductor material is at least 100 µm.

8. The AE Brillouin device of claim 1,
   wherein the AE Brillouin device is adapted to be operated as an amplifier; and
   wherein the amplifier has one of a linear or an optically resonant configuration.

9. The AE Brillouin device of claim 1,
   wherein the AE Brillouin device is adapted to be operated as an oscillator; and
   wherein the AE Brillouin device further comprises an optical resonator, the optical resonator adapted to be optically coupled to the waveguide.

10. The AE Brillouin device of claim 1,
    wherein the AE Brillouin device is adapted to be operated as an isolator;

wherein the waveguide is a drive waveguide, the drive waveguide adapted to create an acousto-optic grating due to the optical signal and the optical pump; and wherein the AE Brillouin device further comprises a modulator waveguide, the modulator waveguide adapted to be phononically coupled to the drive waveguide, the modulator waveguide adapted to receive a modulated signal, the modulated signal being transmitted when applied to a first end of the modulator waveguide, the modulated signal being scattered when applied to a second end of the modulator waveguide opposite the first end of the modulator waveguide.

11. The AE Brillouin device of claim 1, wherein the AE Brillouin device is adapted to be operated as a phononic memory;

wherein the phononic memory has one of a linear or an optically resonant configuration; and wherein an effective delay length of the phononic memory is a function of the drift field.

12. The AE Brillouin device of claim 1, wherein the AE Brillouin device further comprises first and second optical grating couplers, the first and second optical gratings located on corresponding opposite ends of the waveguide, each of the first and second optical gratings adapted to transmit or receive the optical signal or the optical pump.

13. The AE Brillouin device of claim 1, wherein the layer adapted to support AE coupling includes at least one of $LiNbO_3$, AlN, ScAlN, Ge, GaAs, GaP, or GaN.

14. The AE Brillouin device of claim 1, wherein the substrate includes silicon or sapphire.

15. The AE Brillouin device of claim 1, wherein at least a portion of the waveguide is suspended above the substrate.

16. The AE Brillouin device of claim 1, wherein a thickness of the waveguide is between approximately 100 nm and approximately 300 nm.

17. The AE Brillouin device of claim 1, wherein a width of the waveguide is between approximately 0.5 µm and approximately 2.0 µm.

18. The AE Brillouin device of claim 1, wherein the semiconductor material includes InGaAsP, InGaAs, or Si.

19. The AE Brillouin device of claim 1, wherein the waveguide is adapted to support two optical modes, each of the two optical modes being one of a $TE_0$ optical mode, a $TE_1$ optical mode, a $TE_2$ optical mode, a $TM_0$ optical mode, or a $TM_1$ optical mode.

20. The AE Brillouin device of claim 1, wherein the waveguide is adapted to support at least one of a Rayleigh acoustic mode, a shear horizontal acoustic mode, or an acoustic waveguide mode.

* * * * *